(12) United States Patent
Visentin et al.

(10) Patent No.: US 11,321,551 B2
(45) Date of Patent: May 3, 2022

(54) DETECTING A SCAN USING ON-DEVICE SENSORS

(71) Applicant: Facebook, Inc., Menlo Park, CA (US)

(72) Inventors: Matteo Visentin, Seattle, WA (US); Dean Jackson, Seattle, WA (US); John Stephen Ketchpaw, Seattle, WA (US); James F. Geist, Jr., Issaquah, WA (US); Francislav P. Penov, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 650 days.

(21) Appl. No.: 15/372,073

(22) Filed: Dec. 7, 2016

(65) Prior Publication Data

US 2018/0157884 A1   Jun. 7, 2018

(51) Int. Cl.
| | |
|---|---|
| G06K 7/14 | (2006.01) |
| G06K 19/06 | (2006.01) |
| G06Q 30/02 | (2012.01) |
| G06K 7/10 | (2006.01) |
| H04W 4/21 | (2018.01) |
| H04W 4/23 | (2018.01) |
| G06Q 50/00 | (2012.01) |

(52) U.S. Cl.
CPC ......... *G06K 7/1447* (2013.01); *G06K 7/1095* (2013.01); *G06K 7/1417* (2013.01); *G06K 19/06037* (2013.01); *G06K 19/06112* (2013.01); *G06Q 30/0239* (2013.01); *G06Q 50/01* (2013.01); *H04M 2201/20* (2013.01); *H04W 4/21* (2018.02); *H04W 4/23* (2018.02)

(58) Field of Classification Search
CPC ...... G06T 7/20; G06Q 50/01; G06Q 30/0207; G06K 7/1095; G06K 7/1447; H04W 4/21; H04W 4/23
See application file for complete search history.

(56) References Cited

U.S. PATENT DOCUMENTS

| | | | | |
|---|---|---|---|---|
| 5,396,053 A * | 3/1995 | Swartz | ............... | G06K 7/10633 |
| | | | | 235/462.15 |
| 5,449,893 A * | 9/1995 | Bridgelall | .......... | G06K 7/10851 |
| | | | | 235/462.27 |
| 6,082,621 A * | 7/2000 | Chan | ................... | G06K 7/10851 |
| | | | | 235/462.16 |
| 6,969,002 B2 * | 11/2005 | Creamer | .................. | G06K 1/12 |
| | | | | 235/462.01 |
| 8,141,783 B2 * | 3/2012 | Harris | .............. | G06K 19/06028 |
| | | | | 235/380 |

(Continued)

*Primary Examiner* — Daniel I Walsh
(74) *Attorney, Agent, or Firm* — Keller Preece PLLC

(57) ABSTRACT

The present disclosure is directed towards systems and method for determining whether a scannable code displayed on a client device has been scanned. In particular, the systems and methods described herein involve activating one or more on-board sensors of the client device to capture output signals. Based on the output signals, the systems and methods include identifying discrete signals that indicate whether the scannable code has been scanned by a scanning device. Further, based on an analysis of the identified discrete signals, the systems and methods include determining whether the scannable code has been scanned by the scanning device.

20 Claims, 10 Drawing Sheets

(56) References Cited

U.S. PATENT DOCUMENTS

| | | | |
|---|---|---|---|
| 8,430,317 B2* | 4/2013 | Ross | G06K 7/1095 |
| | | | 235/462.09 |
| 8,684,271 B2* | 4/2014 | Harris | G06K 19/00 |
| | | | 235/462.01 |
| 8,827,157 B1* | 9/2014 | Foster | G06K 7/1095 |
| | | | 235/375 |
| 8,827,160 B1* | 9/2014 | Pascal | A63F 13/10 |
| | | | 235/462.01 |
| 9,582,952 B1* | 2/2017 | Brillante | G07C 11/00 |
| 10,057,461 B2* | 8/2018 | Shimazaki | H04N 1/4426 |
| 10,127,422 B1* | 11/2018 | Jouβen | G06K 7/10881 |
| 2001/0019614 A1* | 9/2001 | Madoukh | G06F 17/30067 |
| | | | 380/277 |
| 2003/0002667 A1* | 1/2003 | Gougeon | G07F 7/10 |
| | | | 380/44 |
| 2003/0009382 A1* | 1/2003 | D'Arbeloff | G06Q 20/02 |
| | | | 705/17 |
| 2003/0085284 A1* | 5/2003 | Bremer | G06K 7/10871 |
| | | | 235/462.32 |
| 2004/0118923 A1* | 6/2004 | Creamer | G06K 1/12 |
| | | | 235/462.01 |
| 2005/0038982 A1* | 2/2005 | Park | G06F 1/162 |
| | | | 713/1 |
| 2005/0120233 A1* | 6/2005 | Halcrow | G06F 21/46 |
| | | | 713/193 |
| 2005/0125301 A1* | 6/2005 | Muni | G06Q 20/208 |
| | | | 705/23 |
| 2006/0056624 A1* | 3/2006 | Ishiguro | G06F 21/10 |
| | | | 380/46 |
| 2006/0261167 A1* | 11/2006 | Ray | G06K 7/10851 |
| | | | 235/462.08 |
| 2008/0133336 A1* | 6/2008 | Altman | G06Q 30/0207 |
| | | | 455/456.1 |
| 2009/0024477 A1* | 1/2009 | Kramer | G06Q 30/02 |
| | | | 705/14.25 |
| 2009/0049411 A1* | 2/2009 | Shim | G06F 3/0482 |
| | | | 715/841 |
| 2009/0144139 A1* | 6/2009 | Gaedcke | G06Q 30/00 |
| | | | 705/14.69 |
| 2009/0287558 A1* | 11/2009 | Seth | G06Q 30/0221 |
| | | | 705/14.22 |
| 2009/0294541 A1* | 12/2009 | Nunnink | G06K 7/10881 |
| | | | 235/470 |
| 2010/0125490 A1* | 5/2010 | Kiciman | G06Q 30/02 |
| | | | 705/14.1 |
| 2010/0225580 A1* | 9/2010 | Yoon | G06F 3/0304 |
| | | | 345/157 |
| 2011/0101086 A1* | 5/2011 | Yach | G06Q 10/10 |
| | | | 235/375 |
| 2011/0175805 A1* | 7/2011 | Rottler | G09G 5/00 |
| | | | 345/156 |
| 2012/0056801 A1* | 3/2012 | Bevilacqua | G06F 3/04883 |
| | | | 345/156 |
| 2012/0104084 A1* | 5/2012 | Wang | G06K 19/06037 |
| | | | 235/375 |
| 2012/0138684 A1* | 6/2012 | Van Volkinburg | |
| | | | G06K 7/10386 |
| | | | 235/455 |
| 2012/0259686 A1* | 10/2012 | Yurow | G06Q 30/0207 |
| | | | 705/14.17 |
| 2012/0295591 A1* | 11/2012 | Boudville | G06F 17/30879 |
| | | | 455/414.1 |
| 2012/0303431 A1* | 11/2012 | Phillips | G06Q 30/02 |
| | | | 705/14.22 |
| 2012/0306770 A1* | 12/2012 | Moore | G06F 3/01 |
| | | | 345/173 |
| 2013/0024267 A1* | 1/2013 | Libenson | G06Q 30/02 |
| | | | 705/14.38 |
| 2013/0221195 A1* | 8/2013 | Kennedy | H01L 27/14618 |
| | | | 250/208.1 |
| 2013/0246138 A1* | 9/2013 | Johnson | G06Q 30/02 |
| | | | 705/14.16 |
| 2013/0262204 A1* | 10/2013 | Stiles | G06Q 30/0211 |
| | | | 705/14.13 |
| 2014/0022285 A1* | 1/2014 | Stovicek | G06F 1/1694 |
| | | | 345/650 |
| 2014/0229254 A1* | 8/2014 | Dammous | G06Q 30/0251 |
| | | | 705/14.19 |
| 2015/0001299 A1* | 1/2015 | Crooks | G06K 7/10584 |
| | | | 235/440 |
| 2015/0161643 A1* | 6/2015 | Randell | G06Q 20/0457 |
| | | | 705/14.26 |
| 2015/0269600 A1* | 9/2015 | Randle | G06Q 30/0212 |
| | | | 705/14.14 |
| 2015/0363807 A1* | 12/2015 | Katz | G06Q 30/0224 |
| | | | 705/14.1 |
| 2015/0379320 A1* | 12/2015 | Slowik | G06K 7/10732 |
| | | | 235/455 |
| 2016/0048826 A1* | 2/2016 | Fefferman | G06Q 20/3274 |
| | | | 705/23 |
| 2016/0147994 A1* | 5/2016 | Lu | H04L 63/0492 |
| | | | 726/26 |
| 2016/0148241 A1* | 5/2016 | Walsh | G06Q 30/0238 |
| | | | 705/14.26 |
| 2016/0163288 A1* | 6/2016 | Ushijima | G06F 3/147 |
| | | | 345/619 |
| 2016/0239284 A1* | 8/2016 | Boudville | H04W 76/10 |
| 2016/0253656 A1* | 9/2016 | Dragushan | G06Q 20/3226 |
| | | | 705/71 |
| 2017/0255957 A1* | 9/2017 | Mehta | G06Q 20/387 |
| 2017/0286726 A1* | 10/2017 | Cohen | G06K 19/07705 |
| 2017/0337407 A1* | 11/2017 | Chang | G06K 7/1404 |
| 2017/0337456 A1* | 11/2017 | Chang | G06K 19/06028 |
| 2018/0025554 A1* | 1/2018 | Gibson | B60W 50/14 |
| | | | 701/36 |
| 2018/0053027 A1* | 2/2018 | Todeschini | G06K 7/10841 |
| 2018/0144362 A1* | 5/2018 | Ketchpaw | H04L 67/20 |
| 2018/0157884 A1* | 6/2018 | Visentin | G06K 7/1447 |
| 2019/0122012 A1* | 4/2019 | Lei | G06K 7/1404 |
| 2020/0410549 A1* | 12/2020 | Buchalter | G06Q 30/0249 |

\* cited by examiner

DETECTING A SCAN USING ON-DEVICE SENSORS

BACKGROUND

The Internet is an increasingly popular mechanism for delivering digital content to end-users. Indeed, it is now common for marketers to promote various goods or services by distributing coupons having scannable codes to potential customers. Further, with the increased capabilities of mobile devices, users can receive and redeem scannable electronic coupons using their mobile devices (e.g., smart phones). Thus, distributing electronic coupons having scannable codes is an effective tool for promoting products and boosting sales.

Merchants and other entities involved with distributing electronic coupons, however, experience difficulty when attempting to track the effectiveness of those coupons. For example, many merchants distribute electronic coupons that are redeemed offline and without providing a notification or confirmation to the merchant that the electronic coupon has been redeemed. As such, while many merchants are able to identify a general boost in sales corresponding to distribution of electronic coupons, merchants often fail to gather additional information about the conversion rate of the electronic coupons, who used the electronic coupons, when the electronic coupons were redeemed, etc.

Further, even where merchants have systems in place to gather information associated with the usage of distributed electronic coupons, conventional systems for distributing electronic coupons and reporting usage of those coupons often fail to provide up to date and accurate information about usage of the electronic coupons. For example, where a merchant distributes electronic coupons to end-users via a distribution chain of multiple parties (e.g., marketer, vendor, social networking system, software application), communication between one or more entities of the distribution chain often breaks down, thus resulting in a failure to notify the merchant or other interested party of use or non-use of an electronic coupon. Additionally, where a communication network or system breaks down of any individual entity involved in distributing or redeeming electronic coupons, data also becomes lost and the merchant fails to receive relevant information. As such, merchants often receive partial or incomplete reports of coupon use.

Moreover, merchants, vendors, marketers, retailers, and other entities involved in distributing and/or redeeming electronic coupons often use different electronic systems having different features or protocols for redeeming and reporting coupon use. For example, while a particular retailer may effectively redeem and report use of an electronic coupon, another retailer may refuse to honor an electronic coupon without providing any notification to the merchant or marketer of the failure to honor the electronic coupon. Further, some retailers may redeem an electronic coupon, but fail to timely report usage information for days, weeks, or months, or simply provide different information than provided by another retailer.

Thus, there are a number of considerations to be made in identifying and reporting usage of electronic coupons.

SUMMARY

One or more embodiments described herein provide benefits and/or solve one or more of the foregoing problems in the art with systems and methods for identifying use and reporting use of scannable codes. In particular, the disclosed systems and methods relate to determining whether a scannable code displayed on a client device has been scanned. For example, the systems and methods described herein include detecting a display of a scannable code by a client device. In response to detecting the display, the systems and methods activate one or more on-device sensors of the client device to capture outputs of the sensors of the client device. Further, the systems and methods described herein involve analyzing the captured outputs to identify a combination of one or more discrete signals that indicate whether the scannable code has been scanned. Based on the identified discrete signal(s), the systems and methods described herein determine whether a scanning device has scanned the scannable code.

Thus, the systems and methods described herein use on-board functionality of client devices to independently determine whether a code has been scanned. In particular, the systems and methods use sensors on-board a client device to identify signals that indicate whether a scannable code has been scanned by a code-scanning device. In this way, systems and methods described herein circumvent potentially flawed chains of communication between merchants, vendors, marketers, and other entities to ensure an accurate accounting of electronic coupons that have been distributed to end-users. Additionally, the systems and methods described herein facilitate a comprehensive collection of scanning data independent of functionality, protocols, and/or reliability of equipment and communication networks used by merchants, vendors, retailers, or other entities at a point of sale.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
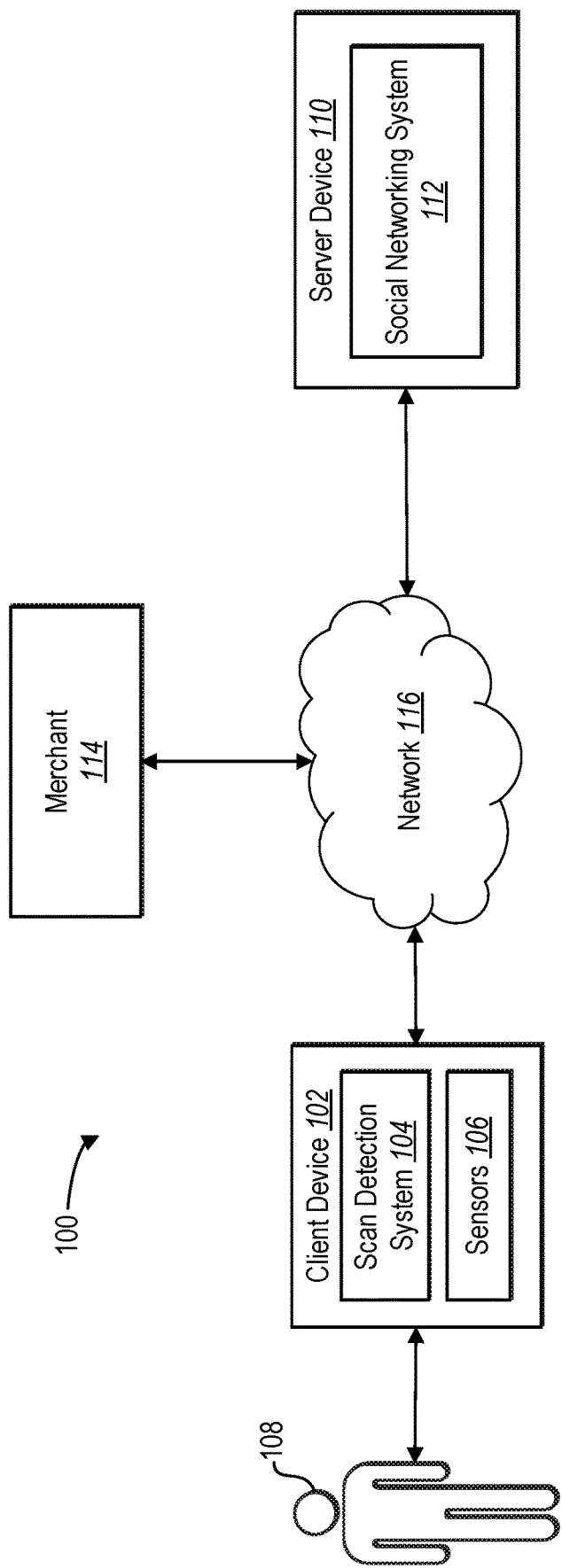
FIG. 1 illustrates a block diagram of an environment in which a scan detection system is implemented in accordance with one or more embodiments.

One or more embodiments described herein include a scan detection system that uses on-board sensors of a client device (e.g., a mobile client device) to determine whether a scannable code displayed on the client device has been scanned. In particular, the scan detection system detects a display of a scannable code on a client device and activates one or more sensors of the client device to capture sensor outputs. In addition, the scan detection system analyzes the captured sensor outputs to identify one or more discrete signals that indicate whether the scannable code has been scanned by a scanning device. Based on the identified signals, the scan detection system determines whether the scannable code has been scanned.

As used herein, a "scannable code" refers to a machine-readable representation of data capable of being read by a scanning device. For example, a scannable code can refer to a series of numbers, a two or three-dimensional pattern of lines, symbols, shapes, or other visual features that identify a product, person, or otherwise includes readable data. For instance, one or more embodiments described herein relate specifically to barcodes and quick response (QR) codes. Additionally, in one or more embodiments, a scannable code refers to a non-visual code including, for example, a magnetic strip, a readable chip, a smart card, a radio frequency (RF) chip, or other scannable object.

As used herein, a "scanning device" refers to an electronic or computing device capable of scanning (e.g., reading and interpreting) a scannable code. In one or more embodiments, a scanning device refers to a different electronic device based on a respective type of scannable code. For example, in the case of a barcode, a scanning device can refer to a hand-held or stationary optical scanner. Alternatively, in the case of a QR code, a scanning device can refer to a camera and electronic device that captures and interprets the QR code. Other types of scannable codes may refer to different types of scanning devices.

As will be described in further detail below, the scan detection system enables a client device to locally determine that a scannable code has been scanned (e.g., by a scanning device) using on-board sensors of the client device. Thus, where a scannable code refers to a code included with an electronic coupon, the scan detection system can determine that the coupon code has been scanned independent from any functionality or protocols of a system used by a vendor, merchant, retailer, or other entity involved in distributing, redeeming, or otherwise collecting analytic data regarding usage of the coupon code. For example, in one or more embodiments, the scan detection system uses on-device sensors of the client device to identify discrete signals or various combinations of discrete signals that indicate whether a scannable code has been scanned.

As used herein, an "on-device sensor," a "local sensor," or "sensor" of a client device refers to any data-capturing sensor device on a client device that is capable of capturing location data, visual data (e.g., images, video), audio data, motion data, temperature data, proximity data, or other types of data. For example, in one or more embodiments, a sensor device refers to a camera (e.g., front camera, back camera), an optical sensor, a global positioning system (GPS), a microphone, an accelerometer, a gyroscope, a thermometer, a compass, a barometer, or any hardware sensor device on a client device that is capable of capturing raw data and generating an output signal (e.g., analog or digital signal). Additionally, in one or more embodiments, a sensor refers to a data-capturing device for capturing raw data as well as circuitry for filtering, digitizing, or otherwise modifying the captured data to generate a sensor output.

To illustrate, merchants, marketers, or various businesses may collaborate with a social networking system (or other communication or networking system) to provide electronic coupons to users of the social networking system. For example, in one or more embodiments, merchants cooperate with a social networking system to provide and manage distribution of electronic coupons to general users of the social networking system or, alternatively, to a target audience of selected users of the social networking system. Thus, in one or more embodiments, the social networking system can participate in providing electronic coupons to be displayed on client devices (e.g., mobile client devices) associated with users of the social networking system. Additionally, in one or more embodiments, the social networking system implements a scan detection system on the client device that further enables the client device to independently determine whether one or more electronic coupons have been scanned.

Once an electronic coupon has been distributed, the scan detection system on the client device can locally determine whether the coupon has been redeemed. In particular, and as will be described in further detail below, the scan detection system can trigger activation of sensors on the client device that capture sensor outputs and identify discrete signals that provide an indication of whether the electronic coupon has been redeemed. Thus, using local sensors on the client device, the scan detection system can determine with a high degree of likelihood that the electronic coupon has been redeemed (or has not been redeemed).

As used herein, a "sensor output" refers to raw data captured by a sensor on a client device. For example, a sensor output can refer to an analog or digital signal captured by a GPS, camera, light sensor, microphone, accelerometer, gyroscope, or any other sensor on the client device. The sensor output can refer to raw data as originally captured by a sensor or an output from a sensor device including associated circuitry coupled to the sensor (e.g., filters, digital to analog converters, analog to digital converters). In one or more embodiments, a sensor output refers to an output of the sensor prior to analyzing or determining whether the sensor output provides any indication of whether a scannable code on the client device has been scanned.

As used herein a "discrete signal" refers to one or a combination of sensor outputs determined to provide an indication about whether a scannable code has been scanned. In particular, a discrete signal refers to one or a combination of detected sensor outputs associated with a higher or lower likelihood that a scannable code displayed on a mobile client device has been scanned. For example, a discrete signal can refer to a sensor output or series of sensor outputs representative of a detected object, detected movement, detected sound, detected location, or other signal obtained from one or multiple sensor outputs that has been associated with contributing to a likelihood that a scannable code has been scanned. Thus, in one or more embodiments, a discrete signal refers to one or more sensor outputs that have been analyzed and identified as a discrete signal and thus contributing to a likelihood that a scannable code displayed on a mobile client device has been scanned.

As an illustrative example, a user having a mobile device (e.g., smart phone) may attempt to use an electronic coupon by holding the mobile device and retrieving the electronic coupon. Upon retrieving the coupon, the user may hold the mobile device upright with the displayed coupon facing a cashier to be scanned by a handheld scanning device. After scanning the coupon, the user may place the mobile device in his or her pocket.

In this example, the scan detection system detects that the electronic coupon is displayed on the mobile device. Upon detecting that the electronic coupon is displayed, the scan detection system triggers activation of one or more sensors of the mobile device to capture sensor outputs. The scan detection system can analyze the sensor outputs to identify discrete signals that indicate a code of the electronic coupon has been scanned. For example, one or more motion sensors on the mobile device can detect a defined rotation of the mobile device to display the electronic coupon to the cashier. Further, a visual sensor (e.g., a camera) can capture an image of the handheld scanner. Additionally, an audio sensor (e.g., a microphone) can capture an audible beep of the scanner. The scan detection system can use each of these discrete signals (e.g., phone rotation, scanner image, audio beep) to determine that the electronic coupon has likely been scanned.

In particular, the scan detection system can analyze individual discrete signals and/or combinations of multiple discrete signals to calculate a probability that a scannable code has been scanned. For example, the scan detection system can determine that a discrete signal or defined combinations of discrete signals (e.g., image of scanner+ audible beep) increases the likelihood that a scannable code has been scanned. Alternatively, the scan detection system can determine that a different signal or defined combination of signals decreases the likelihood that the scannable code has been scanned. In one or more embodiments, the scan detection system attributes probability values to different combinations of discrete signals to determine an overall likelihood that the scannable code has been scanned.

After detecting that the scannable code has (or has not) been scanned, the scan detection system can update a scanned status for the electronic coupon. For example, in one or more embodiments, the scan detection system provides a notification to the social networking system that the electronic coupon has been scanned. As another example, the scan detection system can provide information associated with the scanning (e.g., time, location, store, user profile) to the social networking system. Further, the scan detection system can de-activate one or more of the sensors on the client device to avoid collecting non-relevant information and/or over-using battery power of the client device.

Moreover, in one or more embodiments, the scan detection system uses information associated with the scanning to train a model for future predictions. In particular, based on correct and incorrect determinations of scanned codes, the social networking system can train the scan detection system to more accurately predict future instances of scanning codes. For example, the social networking system can identify additional combinations or sequences of discrete signals that indicate a higher or lower probability that a scannable code has been scanned. Using this training information, the social networking system can further update the scan detection system on the client device to more accurately predict future instances of whether a scannable code has been scanned.

Thus, the scan detection system uses local functionality of sensors on a client device to identify offline conversions of electronic coupons. For example, where a marketer or merchant has no mechanism in place to track usage of distributed electronic coupons, the scan detection system determines whether a code on the electronic coupon has been scanned. Additionally, in cases where the social networking system is involved in the distribution of the electronic coupons, the scan detection system can provide information to the social networking system about who used the coupon, where the coupon was used, when the coupon was used, etc. In this way, the social networking system can identify specific demographics that use particular coupons for use in future marketing campaigns.

In addition, even where a merchant, marketer, or other entity has procedures in place to track usage of electronic coupons, the scan detection system provides additional confirmation and overcomes occasional breakdowns in the chain of communication between parties involved in distributing and/or redeeming electronic coupons that make use of scannable codes. For example, the scan detection system can provide a confirmation that an electronic coupon has been used by a particular user at a particular store. Additionally, where a vendor's system or communication network goes down, the scan detection system can similarly provide a report that the electronic coupon has been redeemed. In this way, the scan detection system provides an independent mechanism for determining whether a coupon has been used that involve no additional infrastructure or oversight from a merchant, vendor, retailer, or other party involved in redeeming the electronic coupon.

Additional detail will now be provided regarding an environment in which the scan detection system can be implemented. For example, FIG. 1 illustrates a block diagram illustrating an example code-scanning environment 100 (or simply "environment 100") for performing the processes and features described herein. For example, as shown in FIG. 1, the environment 100 includes a client device 102 having a scan detection system 104 and sensors 106 thereon. The environment 100 further includes a user 108 of the client device 102 and a server device 110 having a social networking system 112 implemented thereon. Additionally, as shown in FIG. 1, the system includes a merchant 114 and a network 116 over which the client device 102, server device 110, and merchant 114 communicate. In one or more embodiments, the environment 100 includes additional client devices, additional server devices, and/or additional merchants or other entities involved in distributing scannable codes to a user 108 of the client device 102.

The client device 102, server device 110, merchant 114, and network 116 can communicate using any communication platforms and technologies suitable for transporting and/or otherwise communicating signals and data, including any known communication technologies, devices, media, and protocols supporting of remote data communications, examples of which will be described in more detail below with respect to FIGS. 7-8. In addition, the network 116 may represent a network or collection of networks (such as the Internet, corporate intranet, virtual private network (VPN), local area network (LAN), wireless local network (WLAN), cellular network, wide area network (WAN), metropolitan area network (MAN), or a combination of multiple networks). Thus, the network 116 can include any suitable network over which the client device 102 can access the server device 110 or visa versa. Additional details and examples of networks are described below in connection with FIGS. 8-9.

As mentioned above, the server device 110 includes a social networking system 112. As used herein, a social networking system 112 refers to a system that supports and enables on-line communication, input, interaction, content-sharing, and collaboration between users (e.g., people, businesses) of the social networking system 112. The social networking system 112 can include any number of users including, for example the user 108 of the client device 102 and a merchant 114 having an account (e.g., and profile page) on the social networking system 112.

In one or more embodiments, the social networking system 112 cooperates with the merchant 114 or other entity to provide one or more electronic coupons to user 108 and other users of the social networking system 112. For example, the merchant 114 can use the social networking system 112 to provide an electronic coupon for a product of the merchant 114 to general users of the social networking system 112. Alternatively, in one or more embodiments, the social networking system 112 identifies a targeted group of users of the social networking system that are likely to redeem the electronic coupon.

Additionally, as shown in FIG. 1, the social networking system 112 can cause the server device 110 to provide an electronic coupon to the client device 102. For example, in one or more embodiments, the social networking system 112 provides access to one or more electronic coupons via a scan detection system 104 on the client device 102. In one or more embodiments, the scan detection system 104 refers to an application associated with the social networking system 112. For example, the scan detection system 104 can include or be implemented by a social networking application on the client device 102. In addition, while one or more embodiments described herein relate to a scan detection system 104 that cooperates with a social networking system 112 to perform one or more features and functionality herein, it will be understood that the scan detection system 104 can similarly cooperate with and use features and functionality provided by a networking or communication system capable of distributing codes (e.g., via a messaging platform).

As mentioned above, the scan detection system 104 can determine whether an electronic coupon provided to the client device 102 has been redeemed using one or more sensors 106 of the client device 102. For example, upon detecting that the electronic coupon including a scannable code is displayed on the client device 102, the scan detection system 104 can activate one or multiple sensors 106 on the client device 102 to obtain sensor outputs that would be helpful in determining whether the scannable code has been scanned. In one or more embodiments, the scan detection system 104 activates any number of sensors 106 including, for example, a location sensor (e.g., a GPS sensor), a visual sensor (e.g., camera, optical sensor), an audio sensor (e.g., microphone), a motion sensor (e.g., accelerometer, gyroscope), and one or more additional sensors that capture respective types of sensor outputs. In this way, the scan detection system 104 can monitor location data, visual data, audio data, motion data and other types of data associated with the client device 102 and/or objects in the proximity of the client device 102 (e.g., the user 108, scanning device). As used herein, the terms "activating a sensor" and "activation of a sensor" can comprise activating a sensor itself, activating a communication with a sensor, and/or activating a process of monitoring output signals from a sensor. For example, activating a sensor can include making a sensor operative or active, initiating a communication with a sensor, and/or accessing an output signal from a sensor.

In one or more embodiments, the scan detection system 104 analyzes the detected output signals to identify one or more discrete signals that indicate whether the electronic coupon has been scanned. In particular, the scan detection system 104 can analyze a sensor output or combination of outputs from multiple sensors 106 to identify a predefined signal that provides a positive or negative indication that the electronic coupon has been scanned. For example, based on a detected GPS location of the client device 102 by one or more location sensors, the scan detection system 104 can determine that the client device 102 is at a retail store where the electronic coupon can be redeemed. Additionally, based on captured motion data from one or more motion sensors, the scan detection system 104 can determine that the client device 102 has been rotated 180 degrees around an axis passing between a top and bottom of the client device 102. For example, the scan detection system 104 can determine that the client device 102 has rotated 180 degrees around a vertical, horizontal, or diagonal axis. Moreover, based on captured audio data from one or more audio sensors, the scan detection system 104 can detect an audible beep. Thus, based on a combination or sequence of these discrete signals, the scan detection system 104 can determine that the electronic coupon has likely been redeemed by the user 108.

Upon detecting that the electronic coupon has been redeemed, the scan detection system 104 can perform a number of different actions. For example, in one or more embodiments, the scan detection system 104 provides a notification to the social networking system 112 that the electronic coupon has been redeemed. The scan detection system 104 can further provide information associated with the time, date, location, and other details associated with redeeming the coupon. For example, the scan detection system 104 can provide an indication of the identified discrete signals used by the client device 102 to determine that the electronic coupon was scanned. In one or more embodiments, the scan detection system 104 provides similar information to the merchant 114 or other entity.

The social networking system 112 can similarly perform a number of actions in response to receiving information associated with the redemption of the electronic coupon. For example, the social networking system 112 can provide a report to the merchant 114 about any number of redeemed electronic coupons. Additionally, in one or more embodiments, the social networking system 112 confirms accuracy of the detected coupon redemption to determine whether a particular combination or sequence of discrete signals accurately indicates that a scannable code on the client device 102 has been scanned. Based on the accuracy of detected coupon redemptions, the social networking system 112 can further train the scan detection system 104 to more accurately detect when scannable codes have been scanned. For example, the social networking system 112 can determine new discrete signals to identify previously unknown to the scan detection system 104. Additionally, the social networking system 112 can refine probabilities associated with particular discrete signals and/or specific combinations or sequences of discrete signals that the scan detection system 104 can use to calculate future probabilities of whether scannable codes have been scanned.

Moreover, while one or more embodiments described herein relate specifically to scanning coupon codes associated with electronic coupons distributed via merchants, marketers, or other entities, it is appreciated that features and functionality associated with scanning coupon codes can similarly apply to other types of scannable codes. For example, features and functionality described herein with regard to electronic coupon codes (e.g., barcodes, QR codes) can similarly apply to scanning any type of scannable code (e.g., RF identification codes, infrared codes, near field communication (NFC) codes, Bluetooth codes) scanned via one or more scanning capabilities of the client device 102. For instance, the scan detection system 104 can analyze sensor outputs to identify different combinations of discrete signals that indicate whether a scannable code has been scanned, notwithstanding different combinations of discrete signals corresponding to different types of scannable codes.

Figure 2:
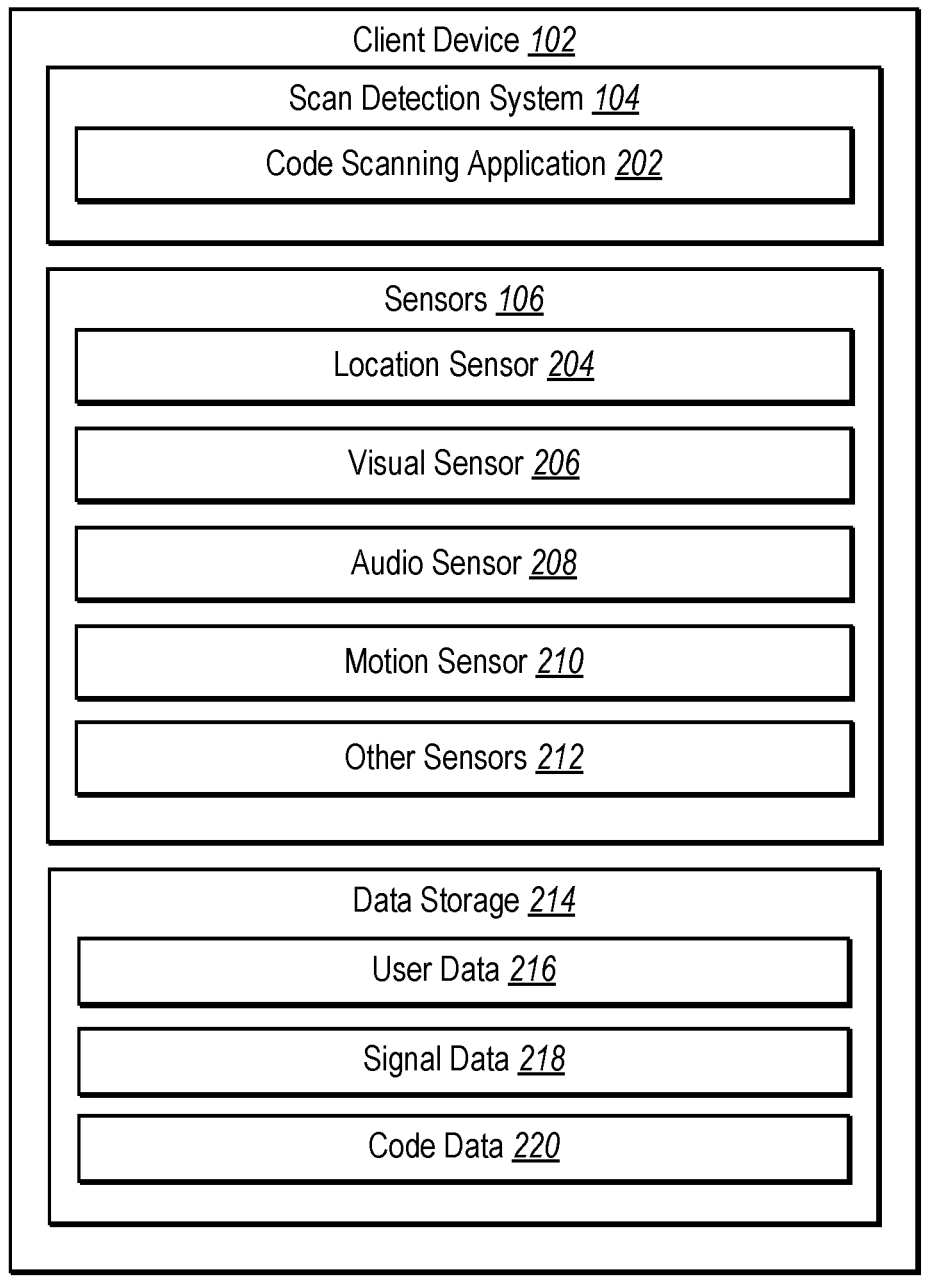
FIG. 2 illustrates a schematic diagram of a client device including the scan detection system in accordance with one or more embodiments.

Turning now to FIG. 2, additional detail will be provided regarding components and capabilities of an example architecture for the scan detection system 104 implemented on the client device 102. In particular, FIG. 2 illustrates an embodiment of the scan detection system 104 on the client device 102 of FIG. 1 that uses sensors 106 of the client device 102 to identify various combinations of one or more discrete signals that indicate whether a scannable code has been scanned by a scanning device. As shown in FIG. 2, the client device 102 includes the scan detection system 104 including a code scanning application 202. Additionally, as shown in FIG. 2, the client device includes a number of on-device sensors 106 including, for example, a location sensor 204, a visual sensor 206, an audio sensor 208, a motion sensor 210, and other sensors 212. It is appreciated that each respective sensor 204-212 can refer to one or multiple sensor devices including one or more devices for capturing raw data and circuitry used in conjunction with a sensor device to generate an analog or digital output. The client device 102 further includes a data storage 214 including user data 216, signal data 218, and code data 220.

As shown in FIG. 2, the scan detection system 104 includes a code scanning application 202. The code scanning application 202 can include software, hardware, or both. For example, the code scanning application 202 can include instructions stored on a computer-readable storage medium and one or more processors of the client device to execute instructions associated with determining whether a scannable code on the client device 102 has been scanned. When executed by the one or more processors, the computer-executable instructions cause the client device 102 to perform the methods described herein. Alternatively, the code scanning application 202 can comprise hardware, such as a special purpose processing device to perform a certain function or group of functions.

In one or more embodiments, the code scanning application 202 refers to an application associated with the social networking system 112. For example, in one or more embodiments, the code scanning application 202 includes a social networking application on the client device 102 having features and functionality described herein with regard to detecting whether a scannable code has been scanned. Thus, in one or more embodiments, the code scanning application 202 includes a software application implemented on the client device 102 via the social networking system 112.

As shown in FIG. 2, the client device 102 further includes a plurality of sensors 106 that detect respective types of signals. For example, as shown in FIG. 2, the sensors 106 include a location sensor 204 that generates a location signal. In one or more embodiments, the location sensor 204 includes a GPS sensor that generates a sensor output including a latitude and longitude of the client device 102. Additionally or alternatively, in one or more embodiments, the location sensor 204 generates a location signal including an identification or name of a recognized location (e.g., name of a store).

As shown in FIG. 2, the sensors 106 further include a visual sensor 206. In one or more embodiments, the visual sensor 206 includes a camera (e.g., front and/or back camera) or an optical sensor (e.g., light sensor) on the client device 102. The visual sensor(s) 206 can generate a visual sensor output including an image, a video, a detection of light, or other sensor output. In one or more embodiments, the client device 102 includes multiple respective visual sensors 206. For example, a first visual sensor can refer to a front camera, a second visual sensor can refer to a back camera, and a third visual sensor can refer to a light detector.

As shown in FIG. 2, the sensors 106 further include an audio sensor 208. In one or more embodiments, the audio sensor 208 includes a microphone or other sound-capturing device on the client device 102. The audio sensors 208 can generate an audio signal including, for example, a digital or analog voltage signal including an amplitude, a frequency, or other metric that may be used to identify characteristics associated with a detected sound. For example, the scan detection system 104 can use the audio sensors 208 to detect an audible beep of a code-scanning device.

As shown in FIG. 2, the sensors 106 further include a motion sensor 210. In one or more embodiments, the motion sensor 210 includes one or more accelerometers, gyroscopes, or other sensors capable of detecting a rotation, orientation, or movement-related metric of the client device 102. The motion sensors 210 can output a digital or analog signal that indicates a rotational movement of the client device 102, an orientation of the client device, or other movements of the client device 102.

As shown in FIG. 2, the sensors 106 further include other sensors 212 on the client device 102 including other sensor-types. For example, the other sensors 212 may refer to proximity sensors, radio frequency (RF) sensors, temperature sensors, pressure sensors, or any hardware sensor on the client device 102 capable of capturing data and generating an output signal. For example, the other sensors 212 may provide a proximity signal, an RF signal, an ambient temperature, a pressure, or other signal that may be used to determine whether a scannable code displayed on the client device 102 has been scanned.

As further shown in FIG. 2, the client device 102 includes a data storage 214 including user data 216. In particular, the user data 216 any information associated with the user 108 of the social networking system 112. For example, the user data 216 can include profile information from a user account of the user 108 maintained by the social networking system 112. For example, the user data 216 can include any demographic information of the user 108 including age, location, or other information provided by the user 108 to the social networking system 112. Additionally, in one or more embodiments, the user data 216 includes information learned about the user 108 over time based on times, locations, or other information associated with the user 108 scanning various codes using the client device 102.

As further shown in FIG. 2, the data storage 214 includes signal data 218. In particular, the signal data 218 includes data captured by the sensors 106 of the client device 102. For example, the signal data 218 can include raw data or processed signal data that the scan detection system 104 uses to determine whether a scannable code has been scanned. Additionally, in one or more embodiments, the signal data 218 includes one or more predefined discrete signals that would provide a positive or negative indication that a scannable code has been scanned. In particular, as will be described in further detail below, the scan detection system 104 can analyze the output signals from the various sensors 106 to identify corresponding predefined discrete signals that indicate whether the scannable code has been scanned.

As further shown in FIG. 2, the data storage 214 includes code data 220. In particular, the code data 220 includes data stored on or otherwise provided to the client device 102 associated with a scannable code. The code data 220 can include a bar code, QR code, or a series of numbers that the client device displays or otherwise provides when scanning the scannable code. In one or more embodiments described herein, the scannable code refers to a coupon code. Alternatively, the scannable code can refer to an electronic ticket or other redeemable code.

Figure 3:
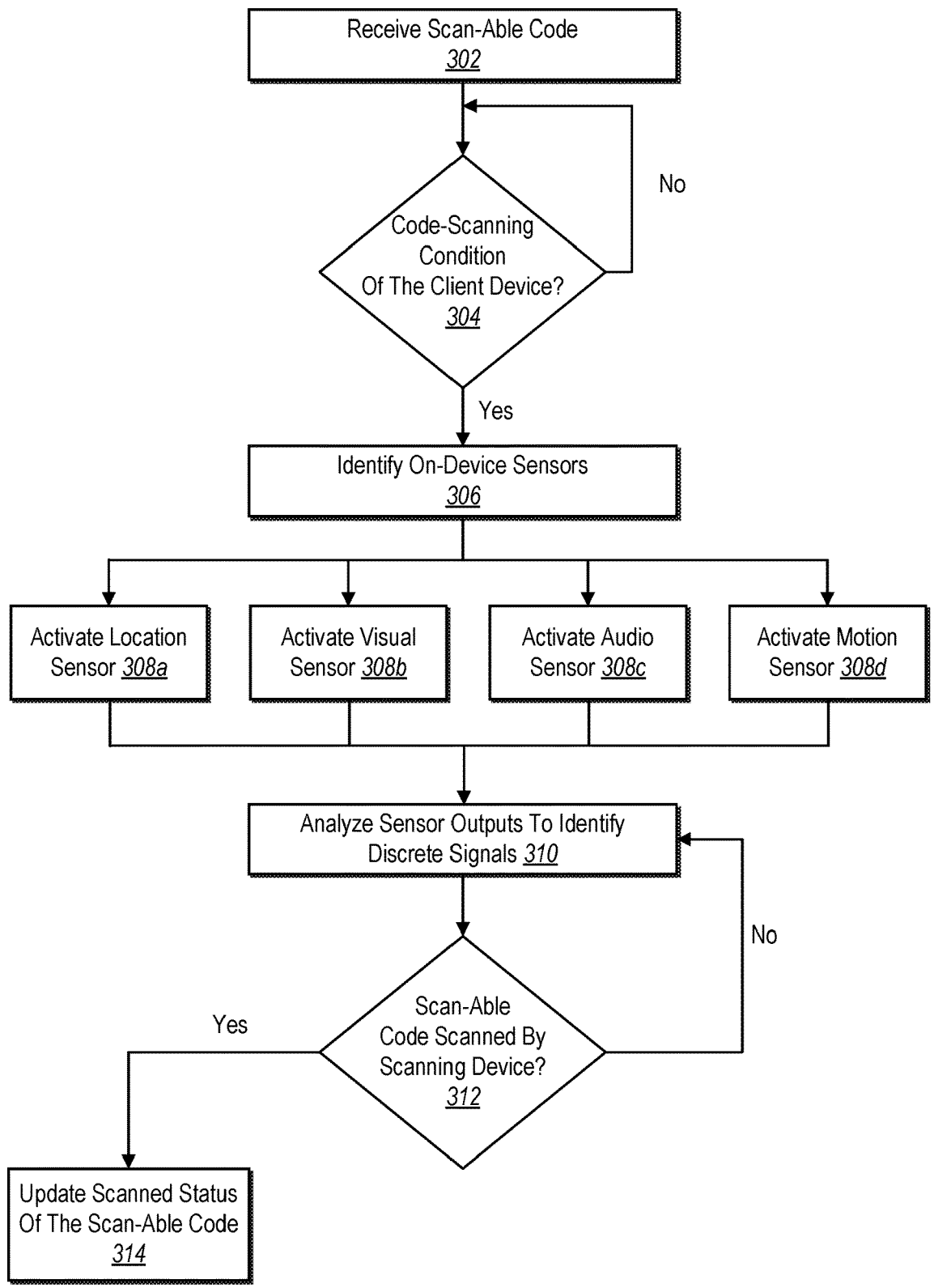
FIG. 3 illustrates a flow diagram of determining whether a scannable code has been scanned by a scanning device in accordance with one or more embodiments.

FIG. 3 illustrates an example method 300 for detecting whether a scannable code has been scanned by a code-scanning device. In particular, the method 300 shown in FIG. 3 illustrates an example implementation that includes determining whether a scannable code displayed on a client device 102 has been scanned by a code-scanning device. Further, while FIG. 3 illustrates example steps according to one embodiments, other embodiments may omit, add to, reorder, and/or modify any of the steps shown in FIG. 3. One or more steps shown in FIG. 3 may be performed by one or a combination of the components illustrated in the environment 100 shown in FIG. 1. For example, in one or more embodiments, the method 300 is performed by the scan detection system 104 on the client device 102. Alternatively, in one or more embodiments, the method 300 is performed cooperatively using both the client device 102 and the social networking system 112 implemented on the server device 110.

For example, as shown in FIG. 3, the method 300 includes receiving 302 a scannable code. In one or more embodiments, the client device 102 receives the scannable code from the social networking system 112. For example, the social networking system 112 can email, text, or otherwise provide the scannable code to the client device 102 on behalf of the merchant 114 or other entity. In one or more embodiments, the social networking system 112 provides electronic coupons having scannable codes to the user 108 of the social networking system 112. For example, the social networking system 112 can manage or otherwise provide access to electronic coupons via a user account of the user 108 on the social networking system 112.

In one or more embodiments, the social networking system 112 provides the scannable code to the user 108 based on a detected location of the client device 102. For example, in one or more embodiments, the social networking system 112 delivers an electronic coupon based on a detected location of the client device 102. To illustrate, if a user 108 checks-in at a particular location or otherwise provides a location of the client device 102 to the social networking system 112, the social networking system 112 can identify and deliver an electronic coupon for a nearby location to the client device 102.

Alternatively, in one or more embodiments, the scan detection system 104 simply alerts the user 108 of previously received electronic coupons available to the user 108 (e.g., via the social networking system 112). For example, the scan detection system 104 can determine a location of the client device 102 and provide a notification (e.g., a push notification) that the user 108 has an electronic coupon for a nearby store. As another example, the scan detection system 104 can determine that an electronic coupon has a coming up expiration data and similarly provide a notification about the electronic coupon.

As shown in FIG. 3, the method 300 further includes identifying 304 a code-scanning condition of the client device 102. In particular, the scan detection system 104 can determine whether conditions surrounding use of the client device 102 suggests that a scannable code accessible to the client device 102 will be scanned by a code-scanning device. In one or more embodiments, the scan detection system 104 determines that a code-scanning condition exists by detecting that an electronic coupon is displayed on the client device 102. For example, the scan detection system 104 can detect that the user 108 has selected an electronic coupon via an application on the client device 102 (e.g., code scanning application 202 or a separate application) and that the electronic coupon is displayed by the client device 102.

While one or more embodiments include identifying the code-scanning condition solely based on detecting that a scannable code is displayed or has been accessed by the user 108, the scan detection system 104 can similarly identify a code scanning condition based on consideration of other factors. For example, in response to detecting that the user 108 has opened the electronic coupon, the scan detection system 104 can identify a location of the client device 102 to determine whether the user 108 is likely to redeem the electronic coupon in the near future. For instance, upon detecting that the electronic coupon is displayed on the client device, the scan detection system 104 can determine a location of the client device 102 and identify, based on the combination of the determined location and the displayed electronic coupon, that a scanning condition exists.

Additionally, while one or more embodiments described herein relate to identifying a code-scanning condition based on whether a scannable code is displayed, it is appreciated that the scan detection system 104 can identify a code scanning condition on a consideration of any number of factors including or excluding whether the scannable code is displayed. For example, the scan detection system 104 can identify a scanning condition based on the client device 102 arriving at a location associated with scanning the scannable code. Additionally, in one or more embodiments, the scan detection system 104 identifies a scanning condition based on one or more received user inputs that indicate a user 108 intends to use the scannable coupon in the near future. For example, upon detecting a user input opening a particular application on the client device, opening an email having an electronic coupon, or otherwise indicating an intent to scan a scannable code, the scan detection system 104 can identify that a code scanning condition exists.

In addition, in one or more embodiments, the scan detection system 104 identifies 306 one or more sensors 106 of the client device 102 that may be used for determining whether the scannable code (e.g., displayed on the client device 102) has been scanned. For example, the scan detection system 104 can select any number of on-device sensors 106 of the client device 102 that might be useful in identifying whether the scannable code has been scanned by a code-scanning device.

In one or more embodiments, the scan detection system 104 selects or otherwise identifies sensors 106 that the user 108 has granted permission for the scan detection system 104 to access. For example, when installing or implementing the scan detection system 104 on the client device 102, the user 108 can specify one or more permission settings (e.g., privacy settings) that allow or exclude access to various sensors 106 of the client device 102 to the scan detection system 104. Alternatively, the user 108 can select or otherwise modify permission settings associated with access to various sensors 106 at any time. As such, the scan detection system 104 can access various sensors 106 in accordance with user preferences or other settings of the scan detection system 104.

The scan detection system 104 can further identify or exclude use of various sensors 106 of the client device 102 based on a detected location of the client device 102. For example, the scan detection system 104 can determine that laws associated with a specific state or location prohibit the use of a camera on the client device 102 while at the location. As another example, the scan detection system 104 can determine that utilizing a camera (or other sensor 106) on the client device 102 at a particular location would violate the privacy of the user 108 or other people within a proximity of the client device 102. Thus, the social networking system 112 and/or scan detection system 104 can maintain a number of locations where sensors 106 of the client device 102 should not be accessed by the scan detection system 104. As such, the scan detection system 104 can exclude using cameras or other identified sensors 106 from future steps of performing the method 300 based on a location of the client device 102 and where the scannable code is displayed on the client device 102.

The scan detection system 104 can further activate 308 the identified sensors 106 of the client device 102. For example, as shown in FIG. 3, the scan detection system 104 can activate 308a one or more location sensors 204 (e.g., GPS) of the client device 102 to generate a location output. In one or more embodiments, the location sensor 204 generates a location output including latitude and longitude coordinates. Additionally or alternatively, the location sensor 204 identifies a specific location (e.g., a retail store) based on the detected location (e.g., based on the detected latitude and longitude) of the client device 102.

As further shown in FIG. 3, the scan detection system 104 can activate 308b one or more visual sensors 206 of the client device 102 to capture a visual output. For example, the scan detection system 104 can activate a front and/or back camera of the client device 102 to capture one or more images or videos. In particular, the scan detection system 104 can use a front and/or back camera of the client device 102 to capture an image or video of the user 108 and/or code-scanning device. As another example, the scan detection system 104 can activate an optical sensor of the client device 102 that measures ambient light around the client device 102 and outputs an audio or digital signal representative of the detected ambient light.

As further shown in FIG. 3, the scan detection system 104 can activate 308c an audio sensor 208 of the client device 102 to capture an audio output. For example, the scan detection system 104 can activate a microphone of the client device 102 to capture an audio signal. In one or more embodiments, the microphone detects a volume and frequency of ambient sounds including, for example, talking, beeping, or other ambient noise. In one or more embodiments, the audio sensor 208 applies a noise filter to detect certain sounds within particular ranges of frequencies. For example, the audio sensor 208 can include a sound filter that eliminates sounds outside a range of beeps generated by typical scanning devices when scanning a scannable code.

As further shown in FIG. 3, the scan detection system 104 can activate 308d a motion sensor 210 to capture a motion output. For example, the scan detection system 104 can activate one or more accelerometers to capture motion data related to the acceleration of the client device 102. As another example, the scan detection system 104 can activate one or more gyroscopes to capture motion data related to rotation of the client device 102. In one or more embodiments, the scan detection system 104 activates a motion sensor 210 including both an accelerometer and gyroscope to generate a motion output representative of both movement and rotation of the client device 102.

As mentioned above, the scan detection system 104 can activate any number of other sensors 212 of the client device 102 to capture various sensor outputs. For example, scan detection system 104 can activate a temperature sensor to capture a temperature output. As another example, the scan detection system 104 can activate a proximity sensor to detect a proximity output. It is appreciated that the scan detection system 104 can activate any on-device sensor 106 of the client device 102 to capture sensor outputs for respective types of sensors 106.

As mentioned above, the scan detection system 104 identifies 306 and activates 308a-d the various sensors 106 (e.g., in response to identifying the scanning condition. Additionally, in one or more embodiments, the scan detection system 104 similarly de-activates one or more of the sensors 106 in response to identifying that the scanning condition no longer applies. For example, if the user 108 moves away from a particular location that triggers the activation of the sensors 106, the scan detection system 104 can respond by de-activating the sensors 106. Alternatively, if one or more interactions of the user 108 with the client device 102 causes the client device 102 to stop displaying the scannable code, the scan detection system 104 can de-activate the sensors 106 and stop the method 300 at any time.

In one or more embodiments, the scan detection system 104 activates a sensor 106 by turning the sensor 106 on (e.g., from an 'off' state). Alternatively, where a sensor 106 is already on and capturing output data, the scan detection system 104 can activate the sensor 106 by accessing an incoming stream of data captured by the sensor 106. Thus, the scan detection system 104 can activate some sensors 106 by turning them on while activating other sensors 106 by simply accessing an output signal or otherwise initiating communication of data from an output of a sensor 106 that is already on. Similarly, as will be described in greater detail below, where a scan detection system 104 de-activates a sensor 106, this may refer to turning a sensor 106 off or, alternatively, to simply stopping the scan detection system 104 from accessing output signals from a sensor 106 that is running on the client device 102.

As further shown in FIG. 3, the scan detection system 104 analyzes 310 the sensor outputs to identify discrete signals. In particular, the scan detection system 104 analyzes data from the sensor outputs to determine whether the sensor outputs correspond to one or more predefined discrete signals that indicate whether the scannable code displayed on the client device 102 has been scanned. For example, the scan detection system 104 can analyze the sensor outputs to identify discrete signals that indicate that the scannable code has been scanned. Alternatively, the scan detection system 104 can analyze the sensor outputs to identify discrete signals that indicate that the scannable code has not been scanned.

In one or more embodiments, the scan detection system 104 analyzes each respective sensor output to identify discrete signals corresponding to each type of sensor 106 on the client device 102. For example, with regard to the location sensor output, the scan detection system 104 can analyze location sensor outputs and identify that the client device 102 is at a location where an electronic coupon is likely to be redeemed. For instance, the scan detection system 104 can analyze the location sensor output including a latitude and longitude and determine that the client device 102 is located at a retail store (or within a threshold proximity of the retail store) where a displayed electronic coupon can be redeemed.

In addition to identifying a discrete signal associated with the identified location, the scan detection system 104 can similarly analyze other information obtained from the location output signal to identify discrete signals that contribute to a likelihood to whether the scannable code has been scanned. For example, the scan detection system 104 can identity a duration that the client device 102 has been at the identified location. The scan detection system 104 can further identify a change in location or movement (e.g., velocity) of the client device 102 to determine if the user 108 is walking, biking, driving, or is leaving the identified location. Thus, based on the location sensor outputs, the scan detection system 104 can similarly identify one or more discrete signals corresponding to duration at a location or movement of the client device 102.

With respect to the visual sensor outputs, the scan detection system 104 can analyze captured images, videos, or other visual outputs to identify discrete signals. For example, using the front and/or back camera of the client device 102, the scan detection system 104 can analyze captured images to identify one or more faces (e.g., user's 108 face, a cashier's face), a scanning device, a scannable code (e.g., reflection of a barcode from a reflective surface), or an identified series of images that provide an indication that the electronic code has been redeemed. In particular, the scan detection system 104 analyzes one or multiple captured images to detect or otherwise identify an object (e.g., face, scanning device, code) indicative of whether the electronic code has been redeemed. As a further example, using an optical sensor, the scan detection system 104 can analyze a presence or absence of ambient light to identify a discrete signal the suggests a scanning device proximate or coming in contact with the client device 102 (And thus indicating that a scannable code was scanned by the scanning device).

With respect to the audio sensor outputs, the scan detection system 104 can analyze captured sounds to identify discrete signals. For example, using the microphone on the client device 102, the scan detection system 104 can analyze a captured sound to identify an audible beep having a volume and/or pitch that corresponds to common scanning devices. In one or more embodiments, the scan detection system 104 analyzes the captured sound and compares the volume and pitch to stored data for different types of scanning devices associated with specific types of scanners and/or specific stores. For example, where a specific store uses a scanning device that has a unique beep, the scan detection system 104 can analyze the audible beep of a scanner device to specifically identify a discrete signal associated with a scanning device of that specific store. Thus, the scan detection system 104 can identify a discrete signal corresponding to a specific type of scanning device and/or scanning devices that are used at specific locations. Along similar lines, in additional embodiments, the scan detection system 104 can use object detection techniques to identify a particular scanning device within a captured image. The scan detection system 104 can further verify—based on a database that indicates the scanning devices used by each retailer—that the detected scanning device matches a record indicating the scanning device used by the retailer at the detected location of the client device 102. In some embodiments, the scan detection system 104 can populate a database of scanning devices used by retailers using crowd-sourcing based on the data gathered by user devices at corresponding retailer locations. In particular, the scan detection system 104 can learn which scanning devices are used by which retailers based on the gathered data of the user devices, and then use this information to further calculate a confidence score that a scannable code has been scanned (e.g., if a detected scanning device matches the expected scanning device for the location/retailer based on data gathered from previous users that made purchases at the location/retailer).

With respect to the motion outputs, the scan detection system 104 can analyze captured motion of the client device to identify discrete signals. For example, using an accelerometer and gyroscope on the client device 102, the scan detection system 104 can analyze captured movement and rotation of the client device 102 to identify defined movements associated with discrete signals. For example, the scan detection system 104 can identify a 90 degree rotation or a 180 degree rotation as well as identify an axis of rotation (e.g., horizontal, vertical) around which the client device 102 rotates. As another example, the scan detection system 104 can identify an abrupt movement or rotation indicative of the user 108 handing the client device 102 to another person (e.g., indicative of the user 108 handing the client device 102 to another person to scan the scannable code). Thus, the scan detection system 104 can identify any defined movement, rotation, or orientation of the client device 102 that provides an indication that a scannable code displayed on the client device 102 has been scanned.

It is appreciated that any of the above discrete signals can provide a positive or negative indication about whether a scannable code displayed on the client device 102 has been scanned. For example, where a client device 102 is constantly moving rather than staying at a fixed location for more than a threshold period of time, the scan detection system 104 can identify a discrete signal that negatively indicates that the scannable code has not been scanned during an identified time period. Alternatively, where a client device 102 is determined to remain at the same location for a defined period of time (e.g., corresponding to a common period of time spent checking out at a cashier), the scan detection system 104 can identify a discrete signal that positively indicates that the scannable code has been scanned during the identified time period.

Additionally, while the scan detection system 104 can analyze captured output signals to identify one or more discrete signals, it is appreciated that the scan detection system 104 can similarly identify one or more discrete signals based on an absence of one or more captured sensor outputs. As an example, the scan detection system 104 identifies a discrete signal based on an absence of an audible beep of a scanning device. As another example, the scan detection system 104 identifies a discrete signal based on an absence of movement or rotation of the client device 102.

As further shown in FIG. 3, the scan detection system 104 can determine 312 whether a scannable code has been scanned by a code scanning device. In particular, upon identifying any number of discrete signals, the scan detection system 104 can analyze the discrete signals to calculate a probability that the scannable code has been scanned. For example, in one or more embodiments, the scan detection system 104 analyzes a plurality of discrete signals based on one or multiple output signals from the sensors 106 on the client device 102 that provide a positive and/or negative indicator that the scannable code has been scanned to calculate a probability associated with whether the scannable code has been scanned.

In one or more embodiments, the scan detection system 104 considers each identified discrete signal individually when calculating a probability that the scannable code has been scanned. For example, the scan detection system 104 can assign a positive or negative value to each identified discrete signal and calculate a probability based on the combination of each identified value. In one or more embodiments, the scan detection system 104 weighs different discrete signals more heavily than others. For example, the scan detection system 104 can consider a location of the client device 102 more heavily than a detected 90 degree or 180 degree rotation of the client device 102 (or visa versa). Nevertheless, the scan detection system 104 can combine each of the discrete probability values and determine an overall probability that the scannable code has been scanned. For example, the scan detection system 104 can determine a probability between −1.00 and 1.00 (or other probability scale) and determine with some level of certainty that the scannable code has been scanned (or not scanned). In one or more embodiments, the scan detection system 104 determines that a scannable code has been scanned if the calculated probability exceeds a threshold value.

In addition or as an alternative to considering discrete signals individually, the scan detection system 104 can assign probability values to different combinations of discrete signals to calculate a probability that the scannable code has been scanned. As an example, the scan detection system 104 identifies a first discrete signal indicating that the client device is at a store, a second discrete signal indicating that the client device has been rotated 180 degrees while displaying the scannable code, and a third discrete signal detecting an audible beep. While each discrete signal may provide a positive indication that the scannable code has been scanned, the presence of all three discrete signals may provide a more significant metric of probability than simply combining probability values assigned to each respective discrete signal. Thus, upon detecting a recognized combination of discrete signals, the scan detection system 104 can determine with a very high level of certainty that the scannable code has been scanned.

Alternatively, where multiple discrete signals may individually weigh in favor of determining that the scannable code has been scanned, the scan detection system 104 can similarly identify one or more recognized combinations of discrete signals (or absence of discrete signals) that indicate the scannable code has not been scanned or at least makes it less likely that the scannable code has been scanned. As an example, the scan detection system 104 can identify a first signal including a detected face of the user 108, and a second signal including multiple detected beeps. The scan detection system 104 can determine that while a detected face and a detected beep might individually weigh in favor that the scannable code has been scanned, the scan detection system 104 can determine that detecting a face with multiple beeps weighs against determining that the scannable code has been scanned. Thus, notwithstanding probabilities associated with individual discrete signals, certain combinations of discrete signals may cause the scan detection system 104 to determine that the scannable code has not likely been scanned.

Further, in one or more embodiments, the scan detection system 104 considers one or more orders or sequences of identified discrete signals in determining whether the code has been scanned. In particular, rather than simply considering a combination of multiple discrete signals, the scan detection system 104 can further consider an order of the identified discrete signals in calculating a probability that the scannable code has been scanned. For example, in one or more embodiments, the scan detection system 104 determines a probability that a displayed code has been scanned by comparing the identified discrete signals to one or more series of discrete signals that reflect common ways that a user 108 would scan a displayed code on the client device 102. Thus, in addition to general combinations of discrete signals, the scan detection system 104 can additionally consider an order of identified discrete signals in determining a probability associated with whether a scannable code displayed on the client device 102 has been scanned.

As an example, while the scan detection system 104 can determine that where a combination of an identified audible beep and detected change in location of the client device 102 positively indicates that a scannable code has been scanned, the scan detection system 104 may determine that an order of first identifying the audible beep followed by the client device 102 moving (e.g., suggesting the user 108 moving away from the store after a purchase) has an additional significance in determining whether the scannable code has been scanned. In contrast, the scan detection system 104 can determine that first identifying movement of the client device 102 (e.g., suggesting that the user 108 has arrived at the store) and then identifying an audible beep without then identifying movement away from the store provides little indication (or even a negative indication) that the scannable code has been scanned.

Additionally, in one or more embodiments, the scan detection system 104 considers individual habits or preferences of the user 108 in determining whether a scannable code has been scanned. For example, over time, the scan detection system 104 and/or social networking system 112 can learn that certain discrete signals including certain combinations or sequences of identified discrete signals provide a better indication of whether the scannable code has been scanned for some users than for other users (e.g., of the social networking system 112). For example, in one or more embodiments, the scan detection system 104 and/or social networking system 112 can train an algorithm for a particular user (or multiple users) to determine which signal outputs correspond to discrete signals or sequences of discrete signals associated with whether a scannable code has been scanned. Thus, the scan detection system 104 can consider trends of identified discrete signals unique to the user 108 when identifying whether the scannable code has been scanned.

To illustrate, a first user may follow a first routine when scanning an electronic coupon. For instance, the first user can cause the mobile phone to display the scannable code upon arriving at a cash register, rotate the mobile phone 180 degrees around a vertical axis to scan the code, and finally place the mobile phone in his or her pocket without first navigating away from the displayed code. Alternatively, a second user may follow a second routine when scanning an electronic coupon. For example, the second user may cause a mobile phone to display the scannable code upon arriving at a cash register, rotate the mobile phone 90 degrees around a horizontal axis to scan the code, and lock the phone prior to putting the phone away.

In the above example, the scan detection system 104 and/or social networking system can associate different probabilities with different combinations of identified discrete signals based on respective users or client devices. For example, based on the first user typically rotating the mobile phone 180 degrees around the vertical axis, the scan detection system 104 or social networking system 112 can uniquely assign a high probability value to combinations of discrete signals including the 180 degree movement for the first user than other types of movements of the mobile device (e.g., a 90 degree movement around a horizontal axis). In contrast, based on the second user habitually tilting the mobile phone 90 degrees around the horizontal axis, the scan detection system 104 and/or social networking system 112 can uniquely assign a high probability value to this combination for the second user than other types of movements of the mobile device (e.g., a 180 degree movement around a vertical axis).

Moreover, in one or more embodiments, the scan detection system 104 considers different combinations based a determined location of the client device 102. For example, where certain stores use hand-held scanners rather than stationary scanners (or a specific model or type of scanning device), the scan detection system 104 can associate a higher probability to combinations of discrete signals including identified scanners associated with a particular location. Additionally, the scan detection system 104 can consider different scanning protocols of different locations when determining a probability of a code being scanned. For example, where certain stores scan a code upon entering the store and other stores scan a code at check-out (or just prior to exiting a store), the scan detection system 104 can consider sequences of detected signals differently based on known protocols of scanning codes at different locations.

In addition to considering one or multiple discrete signals based on signal outputs from sensors 106 of the client device 102, the scan detection system 104 can additionally consider one or more user inputs that positively or negatively indicate whether the scannable code has been scanned. For example, where a user 108 navigates to a code scanning application 202 or to a page that displays the scannable code and/or modifies a display of the client device 102 to zoom-in or center a display of the scannable code, the scan detection system 104 can determine that this increases the likelihood that the scannable code has been scanned or is about to be scanned. Alternatively, where a user 108 locks the phone or navigates away from the code scanning application 202 or page displaying the scannable code, the scan detection system 104 can determine that this decreases the likelihood that the scannable code has been scanned or is about to be scanned. In one or more embodiments, the scan detection system 104 considers the sequence of one or more user inputs with regard to one or more detected signal outputs to determine whether a particular user input increases or decreases the likelihood that a scannable code has been scanned.

As mentioned above, and as shown in FIG. 3, the scan detection system 104 can determine 312 that the displayed scannable code has been scanned or, alternatively, that the scannable code has not been scanned. Where the scan detection system 104 determines that the scannable code has been scanned, the scan detection system 104 can update 314 the scanned status of the scannable code. As an example, in one or more embodiments, the scan detection system 104 updates the status for the scannable code by modifying upcoming notifications for the user 108. For instance, where the scan detection system 104 provides reminders associated with an expiring coupon, the scan detection system 104 can dismiss future reminders scheduled for an electronic coupon that has been redeemed. In one or more embodiments, the scan detection system 104 simply modifies a future notification by scheduling a reminder for a different electronic coupon.

In addition to taking one or more actions on the client device 102, the scan detection system 104 can update a scanned status by providing a notification to the social networking system 112 (or other entity) that the scannable code has been scanned. For example, the scan detection system 104 can send a notification that the scannable code has been scanned in addition to information associated with scanning the scannable code. In particular, the scan detection system 104 can provide a location, time, date, as well as any discrete signals or combinations of discrete signals identified around when the scan detection system 104 determined that the scannable code was scanned.

As further shown in FIG. 3, in one or more embodiments, where the scan detection system 104 has determined that the scannable code has not been scanned, the scan detection system 104 continues analyzing 310 sensor outputs to identify one or more discrete signals. Alternatively, in response to determining that the scannable code has not been scanned, the scan detection system 104 can perform other operations. For example, in one or more embodiments, the scan detection system 104 waits a duration of time (e.g., a predetermined duration of time) after detecting the code-scanning condition (or after the code-scanning condition is no longer applicable) without detecting that the scannable code has been scanned and de-activates one or more of the on-device sensors 106 of the client device 102. In this way, the scan detection system 104 can avoid over-utilizing a battery of the client device 102. Additionally, the scan detection system 104 can avoid capturing unnecessary or otherwise superfluous data associated with the user 108 or client device 102 other than circumstances immediately surrounding a detected scan of the scannable code. In one or more embodiments, the scan detection system 104 similarly de-activates one or more of the on-device sensors 106 (e.g., in response to determining that the scannable code has been scanned), thus avoiding over-utilizing the battery or capturing unnecessary data associated with the user 108 or client device 102.

Moreover, in one or more embodiments, the scan detection system 104 refines future instances of detecting whether scannable codes have been scanned. For example, upon providing identified discrete signals and the identified determination that the scannable code has been scanned (or not scanned), the social networking system 112 can confirm that the prediction was correct (or incorrect). Based on accuracy and inaccuracy of various predictions, the scan detection system 104 can refine probability values associated with individual discrete signals, combinations of discrete signals, sequences of discrete signals, and/or discrete signals associated with a particular user 108 to better predict future instances of scanning codes displayed on the client device 102. Additionally, in one or more embodiments, the scan detection system 104 and/or social networking system 112 generates new recognizable discrete signals (or combinations/sequences of discrete signals) that correlate with whether a scannable displayed on the client device 102 has been scanned.

Figure 4A:
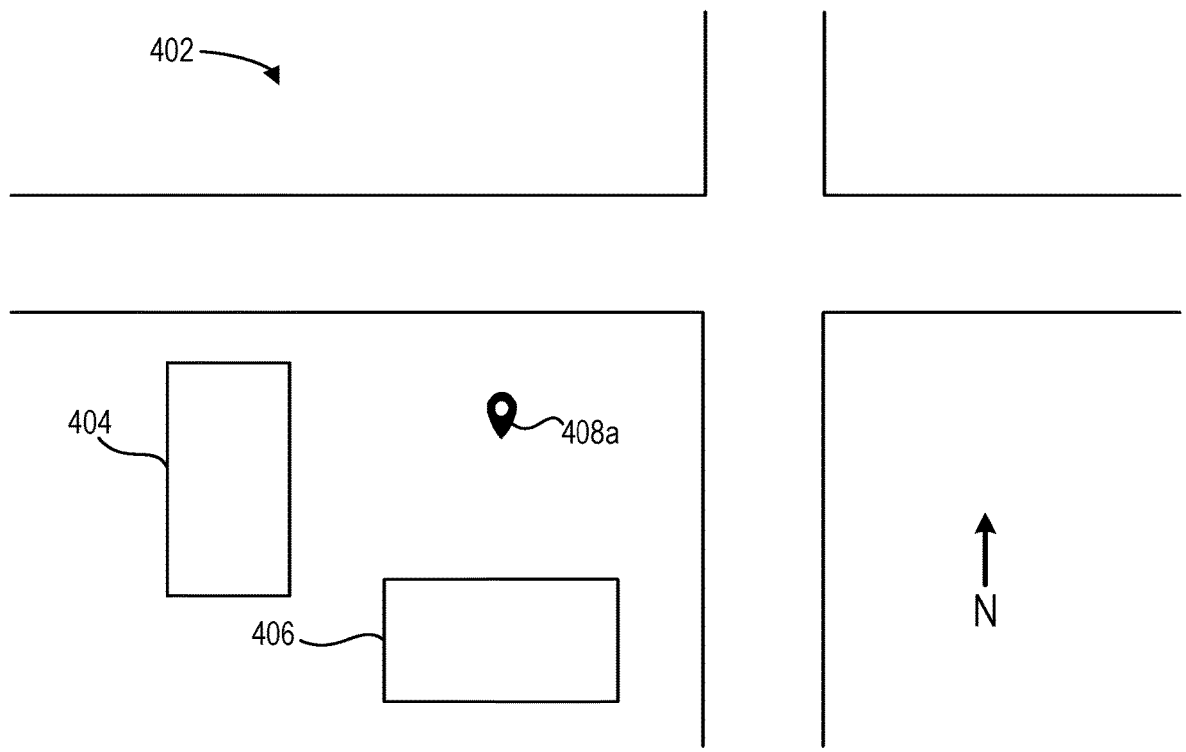
FIGS. 4A-4B illustrate example representations of a display of a client device in accordance with one or more embodiments.
Figure 4B:
Figure 4B:
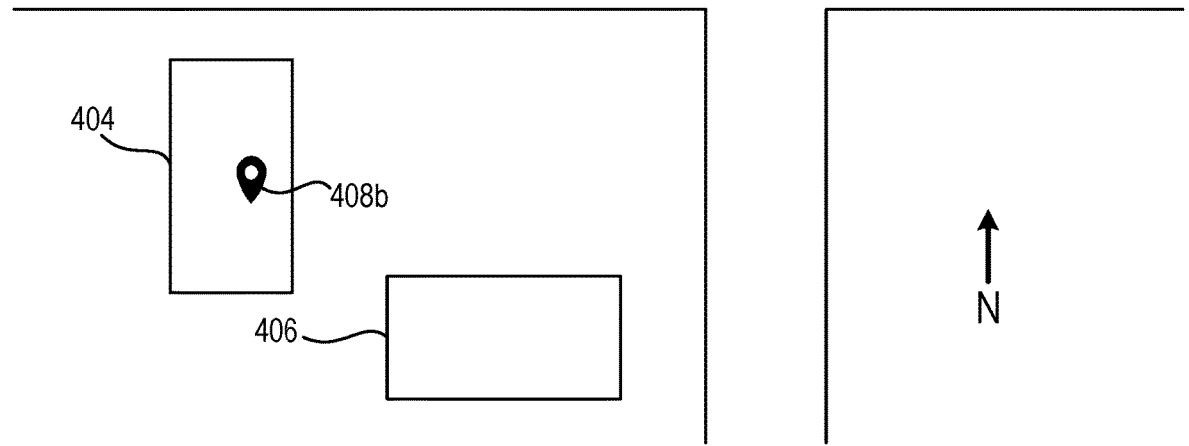

Turning now to FIGS. 4A-5B, additional examples will be provided regarding circumstances in which the scan detection system 104 determines whether a scannable code has been scanned by a scanning device. For example, FIG. 4A illustrates a map 402 including a first retail store 404, a second retail store 406, and a first location 408a of the client device 102. For instance, the first location 408a may refer to a detected GPS location of the client device 102 prior to a user 108 entering one of the retail stores 404, 406. Additionally, FIG. 4B illustrates the first retail store 404, the second retail store 406, and a second location 408b of the client device 102.

As mentioned above, the scan detection system 104 can identify a scanning condition that prompts activation of one or more sensors 106 on the client device 102. For example, the scan detection system 104 can detect a scanning condition based on the first location 408a having a proximity to one or both of the retail stores 404, 406. In particular, the scan detection system 104 can determine that a scanning condition applies if, while at the first location 408a, the user 108 opens an electronic coupon on the client device 102.

Alternatively, even if the user 108 opens an electronic coupon while at the first location 408a, the scan detection system 104 can determine that the scanning condition does not apply unless the client device 102 is within a particular retail store. For example, where an electronic coupon applies specifically to the first retail store 404 and not the second retail store, the scan detection system 104 can determine that the scanning condition applies only upon detecting that the user 108 has opened the electronic coupon while at the second location 408b (e.g., within the first retail store 404). Thus, the scan detection system 104 may activate one or more sensors 106 on the client device 102 to detect a scan of the electronic coupon upon detecting that the electronic coupon is displayed on the client device 102 while within the first retail store 404.

Figure 5A:
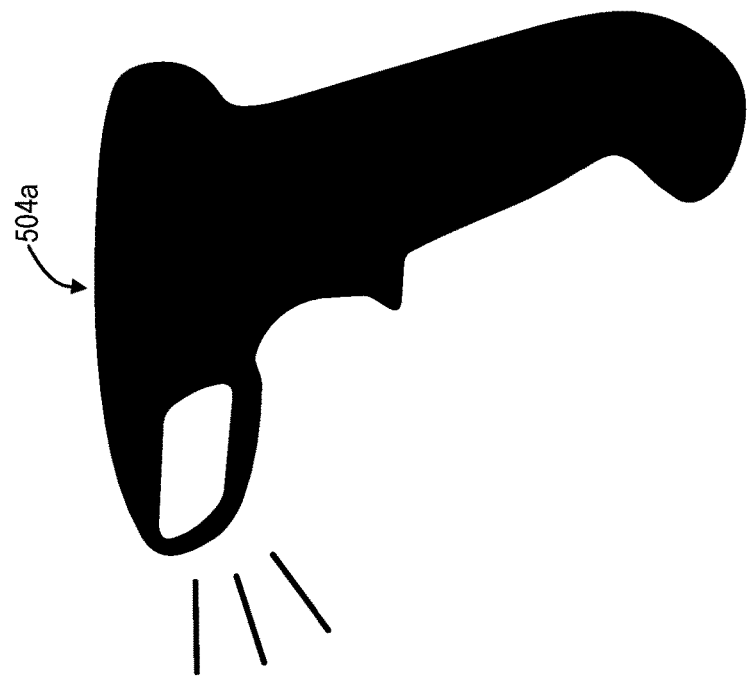
FIGS. 5A-5B illustrate example representations of a scanning device scanning a scannable code on a client device in accordance with one or more embodiments.
Figure 5A:
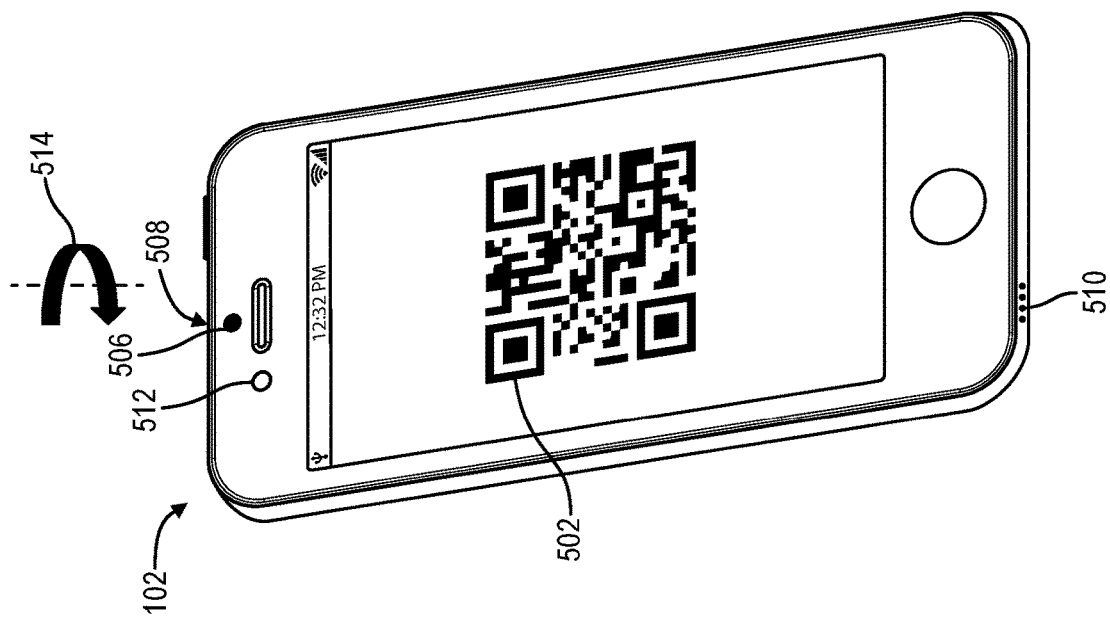

FIG. 5A illustrates an example in which a client device 102 displays a QR code 502 to be scanned by a hand-held scanning device 504a. For example, upon detecting a scanning condition (e.g., display of the QR code 502), the scan detection system 104 can activate any number of sensors on the client device 102. For example, as shown in FIG. 5A, the scan detection system 104 can activate a front camera 506, a back camera 508, a microphone 510, a light sensor 512, and other sensors (e.g., accelerometer, gyroscope, etc.) not shown on the outside of the client device 102.

As discussed above, each of the activated sensors 106 can capture sensor outputs and identify discrete signals based on an analysis of the captured sensor outputs. For example, the scan detection system 104 can identify an image of the hand-held scanner 504a based on images or videos taken by the front camera 506. Additionally, based on images or a video taken by the back camera 508, the scan detection system 104 can identify an image of the user 108 (e.g., the user's face) while holding up the client device 102 to be scanned. Further, the scan detection system 104 can identify an audible beep generated by the hand-held scanner 504a based on detected sounds captured by the microphone 510. Further, based on a visual output of the light sensor 512, the scan detection system 104 can identify light emitted by the hand-held scanner or, alternatively, a lack of light when the client device 102 is held up close to the hand-held scanner 504a. Further, the scan detection system 104 can identify a rotational movement 514 of the client device 102 to position the displayed QR code 502 to be scanned by the hand-held scanner 504a based on motion outputs from an accelerometer and/or gyroscope.

In accordance with one or more embodiments described above, the scan detection system 104 considers each discrete signal to determine a probability that the QR code 502 has been scanned. Additionally or alternatively, the scan detection system 104 considers the combination and/or sequence of each identified discrete signal or the order of discrete signals to determine the probability that the QR code 502 has been scanned. Further, in one or more embodiments, the scan detection system 104 considers the absence of one or more signals to further determine the probability that the QR code 502 has been scanned.

Figure 5B:
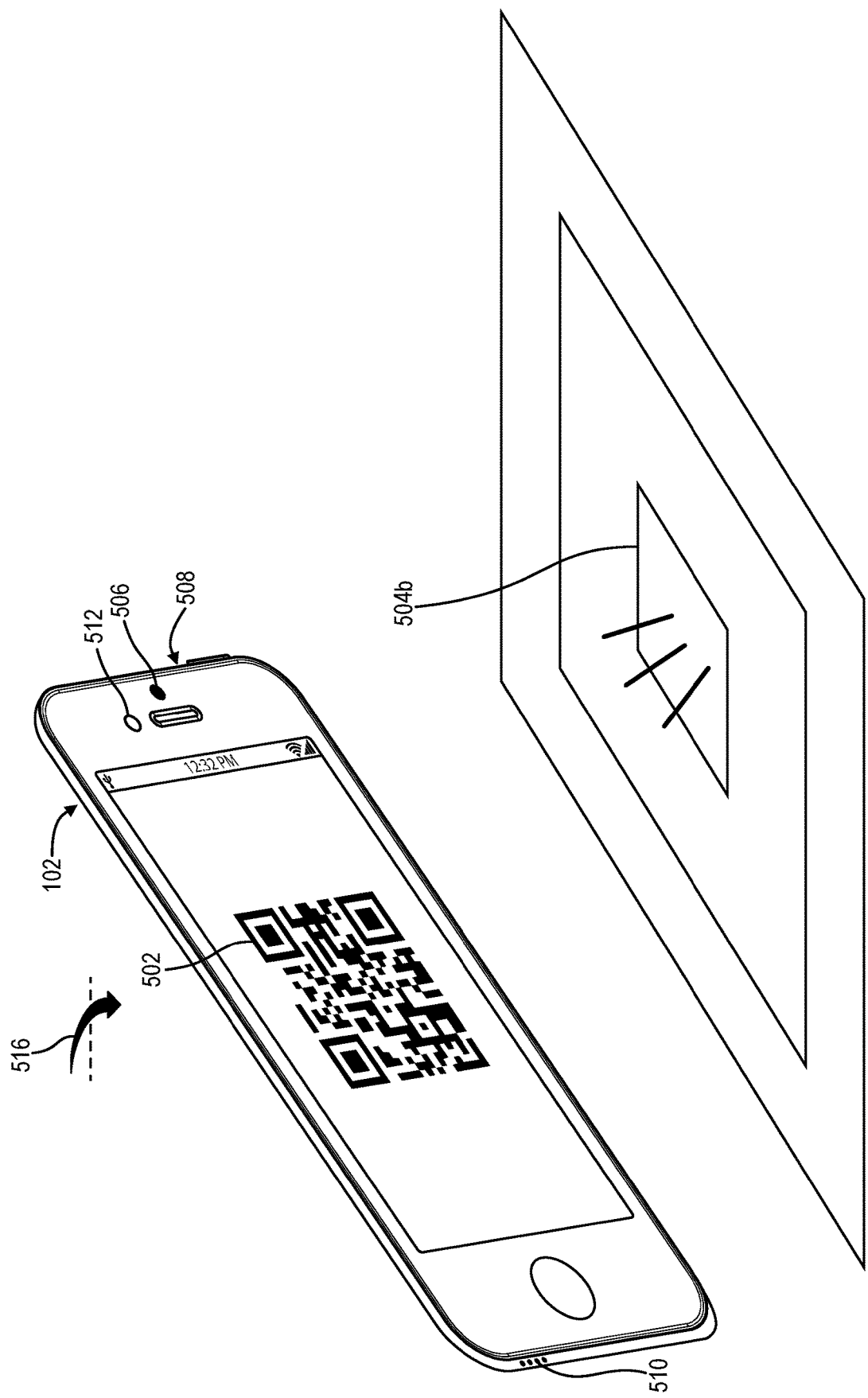

FIG. 5B illustrates another example in which the client device 102 displays the QR code 502 to be scanned by a stationary scanner 504b. For example, upon detecting a scanning condition (e.g., display of the QR code 502), the scan detection system 104 can activate sensors 106 on the client device 102 similar to the sensors 106 described above in connection with FIG. 5A. Additionally, similar to one or more embodiments described above, the scan detection system 104 can analyze respective sensor outputs to identify discrete signals that positively or negatively indicate whether the QR code 502 has been scanned by the stationary scanner 504b.

For example, as shown in FIG. 504B, the scan detection system 104 can identify an image of the stationary scanner 504b based on a captured image or video of the front camera 506. Additionally, the scan detection system 104 can identify an image of the user 108 (e.g., the user's face) based on a captured image or video of the back camera 508. Further, the scan detection system 104 can identify an audible beep generated by the stationary scanner 504b based on a captured sound by the microphone 510. Further, the scan detection system 104 can identify light emitted by the stationary scanner 504b or an absence of light as the client device 102 is placed on top of the stationary scanner 504b based on detected light (or detected absence of light) by the light sensor 512. Further, the scan detection system 104 can detect a 90 degree rotation 516 round a horizontal axis based on detected movement and rotation outputs as captured by an accelerometer and/or gyroscope on the client device 102.

Similar to one or more embodiments described above, the scan detection system 104 can consider each discrete signal and/or combinations of identified discrete signals to determine whether the QR code 502 has been scanned. Further, similar to one or more embodiments described above, the scan detection system 104 can consider an absence of one or more discrete signals to determine a probability that the QR code 502 has been scanned (e.g., by the stationary scanner 504b).

FIGS. 1-5B, the corresponding text, and the examples, provide a number of different systems and devices that enable a scan detection system 104 to determine whether a scannable code displayed on the client device 102 has been scanned by a scanning device. In addition to the foregoing, embodiments can also be described in terms of flowcharts comprising acts and steps in a method for accomplishing a particular result. For example, FIG. 6 illustrates a flowchart of an exemplary method in accordance with one or more embodiments.

Figure 6:
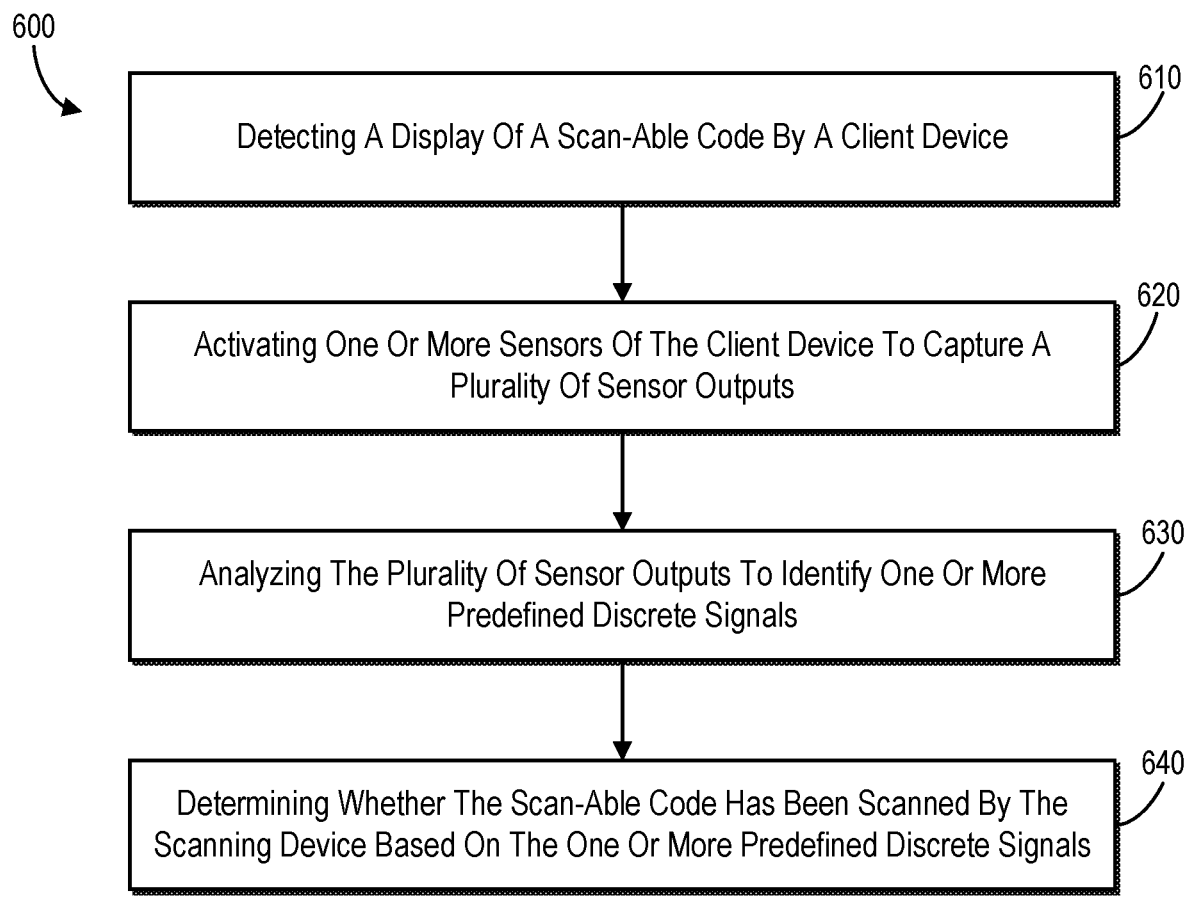
FIG. 6 illustrates a flow diagram of a method for determining whether a scannable code has been scanned in accordance with one or more embodiments.

In particular, FIG. 6 illustrates a flowchart of an example method 600 for determining whether a scannable code has been scanned by a scanning device. The method 600 includes an act 610 of detecting a display of a scannable code by a client device 102. For example, in one or more embodiments, the act 610 involves detecting, by at least one processor on a mobile client device (e.g., client device 102), a display of a scannable code by the mobile client device. In one or more embodiments, the scannable code includes a barcode or a quick response (QR) code.

Additionally, in one or more embodiments, the scannable code refers to a coupon code on an electronic coupon. For example, in one or more embodiments, the method 600 includes receiving, at the mobile client device, the scannable code via a social networking application (e.g., code scanning application 202) on the mobile client device. Further, in one or more embodiments, the social networking application is associated with a social networking system 112. Additionally, in one or more embodiments, upon determining whether the scannable code has been scanned or not, the method 600 can include providing, to the social networking system 112, a notification of whether the scannable code has been scanned by a scanning device.

As further shown in FIG. 6, the method 600 includes an act 620 of activating one or more sensors 106 of the client device 102 to capture a plurality of sensor outputs. For example, in one or more embodiments, the act 620 involves, in response to detecting the display of the scannable code by the mobile client device, activating one or more sensors 106 of the mobile client device to capture a plurality of sensor outputs. In one or more embodiments, activating the one or more sensors 106 includes activating one or more of a location sensor 204, a visual sensor 206, an audio sensor 208, and a motion sensor 210 of the mobile client device.

Additionally, in one or more embodiments, the method 600 includes determining that the mobile client device is at a location associated with scanning the scannable code while detecting the display of the scannable code by the mobile client device. For example, the method 600 can include determining that the client device 102 is located at a retail store or other location known to redeem electronic coupons having the scannable code thereon. Further, in one or more embodiments, activating the one or more sensors 106 involves activating the sensors 106 in response to determining that the mobile client device is at the location associated with scanning the scannable code. For example, the method 600 can include activating the sensors 106 in response to both detecting the display of the scannable code by the mobile client device and determining that the mobile client device is at the location associated with scanning the scannable code.

As further shown in FIG. 6, the method 600 includes an act 630 of analyzing the plurality of sensor outputs to identify one or more predefined discrete signals. For example, in one or more embodiments, the act 630 involves analyzing the plurality of sensor outputs to identify one or more predefined discrete signals that indicate whether the scannable code has been scanned by a scanning device (e.g., a hand-held scanner 504a, a stationary scanner 504b).

In one or more embodiments, analyzing the plurality of sensor outputs includes comparing the captured plurality of sensor outputs to one or more predefined signals that have been determined (e.g., previously determined) to positively or negatively indicate whether a given scannable code displayed on a given client device has been scanned by a scanning device. In addition, analyzing the plurality of sensor outputs to identify the one or more predefined discrete signals can include identifying one or more of the predefined signals corresponding to the captured plurality of sensor outputs. Thus, analyzing the plurality of sensor outputs can involve matching captured output signals from one or multiple sensors 106 to corresponding predefined discrete signals.

For example, in one or more embodiments, the method 600 can include identifying a predefined discrete signal corresponding to a sensor output from a single sensor 106. Further, the method 600 can include identifying a predefined discrete signal corresponding to multiple sensor outputs from the single sensor 106. As another example, the method 600 can include identifying a predefined discrete signal from multiple signals from different types of sensors 106 (e.g., camera output+accelerometer output). As another example, the method 600 can include identifying a predefined discrete signal from multiple signals from similar types of sensors 106 (e.g., front camera+back camera).

As further shown in FIG. 6, the method 600 includes an act 640 of determining whether the scannable code has been scanned by the scanning device based on the one or more predefined discrete signals. For example, in one or more embodiments, the act 640 involves determining, based on the identified one or more predefined discrete signals, whether the scannable code has been scanned by the scanning device. For instance, in one or more embodiments, determining whether the scannable code has been scanned involves calculating a probability that the scannable code has been scanned by the scanning device based on the identified one or more predefined discrete signals. Additionally, in one or more embodiments, determining whether the scannable code has been scanned includes determining whether the calculated probability exceeds a threshold probability that the scannable code has been scanned by the scanning device.

As mentioned above, the method 600 can include determining whether the scannable code has been scanned based on one or more discrete signals. For example, in one or more embodiments, the method 600 includes determining whether the scannable code has been scanned based on individually identified discrete signals. As another example, in one or more embodiments, the method 600 includes determining whether the scannable code has been scanned based on a combination of multiple identified discrete signals (e.g., from the one or more identified discrete signals). As a further example, in one or more embodiments, the method 600 includes determining whether the scannable code has been scanned based on a sequence of multiple identified discrete signals (e.g., from the one or more identified discrete signals).

Moreover, in one or more embodiments, the method 600 involves de-activating the sensors 106. For example, in one or more embodiments, the method 600 involves de-activating the activated one or more sensors 106 (e.g., previously activated in response to detecting the display of the scannable code by the mobile client device) in response to determining whether the scannable code has been scanned by the mobile client device. As another example, in one or more embodiments, the method 600 involves de-activating the activated one or more sensors 106 in response to determining that the scannable code is not displayed by the mobile client device.

As another example, in one or more embodiments, the method 600 involves de-activating the activated one or more sensors 106 in response to determining that the scannable code is not displayed or that the mobile client device has moved away from a location associated with scanning the scannable code. For example, where the method 600 involves activating the one or more sensors 106 in response to both detecting the display of the scannable code by the mobile client device and determining that the mobile client device is at a location associated with scanning the scannable code, the method 600 can similarly de-activate the activated one or more sensors 106 in response to detecting that either of these scanning conditions are not met.

In addition, one or more embodiments of the method 600 include performing various actions based on whether the scannable code has been scanned or not. For example, in one or more embodiments, the method 600 includes updating a scanned status of the scannable code based on a positive or negative determination that the scannable code has been scanned. Additionally, in one or more embodiments, the method 600 includes changing one or more notifications on the client device 102 associated with reminding a user 108 to redeem a coupon having the scannable code thereon. Further, in one or more embodiments, the method 600 involves providing a notification of successful redemptions of electronic coupons to a social networking system 112.

Moreover, in one or more embodiments, the method involves analyzing determinations of whether scannable codes have been scanned. For example, in one or more embodiments, the method 600 involves analyzing demographics or other information associated with users that redeem electronic coupons. In addition, in one or more embodiments, the method 600 includes identifying electronic coupons and/or locations with high or low redemption rates. Further, the method 600 can include analyzing determinations of whether scannable codes have been scanned to identify other metrics such as how long different users (or demographics of user) travel to redeem electronic coupons.

Further, in one or more embodiments, the method 600 includes utilizing information associated with scanning the scannable codes to further refine future instances of determining whether scannable codes have been scanned. For example, in one or more embodiments, the method 600 includes providing a notification that the scannable code has been scanned (or not scanned) to a social networking system 112 that confirms (e.g., with a merchant 114 or other entity) whether the determination was correct or incorrect. In addition, the method 600 includes providing information associated with captured output signals and identified discrete signals that accompany the determination of whether the scannable code was scanned. In one or more embodiments, the method 600 involves fine-tuning future determinations of whether a scannable code has been scanned based on captured output signals, identified discrete signals, and identified confirmations of when/where scannable codes have been scanned.

Figure 7:
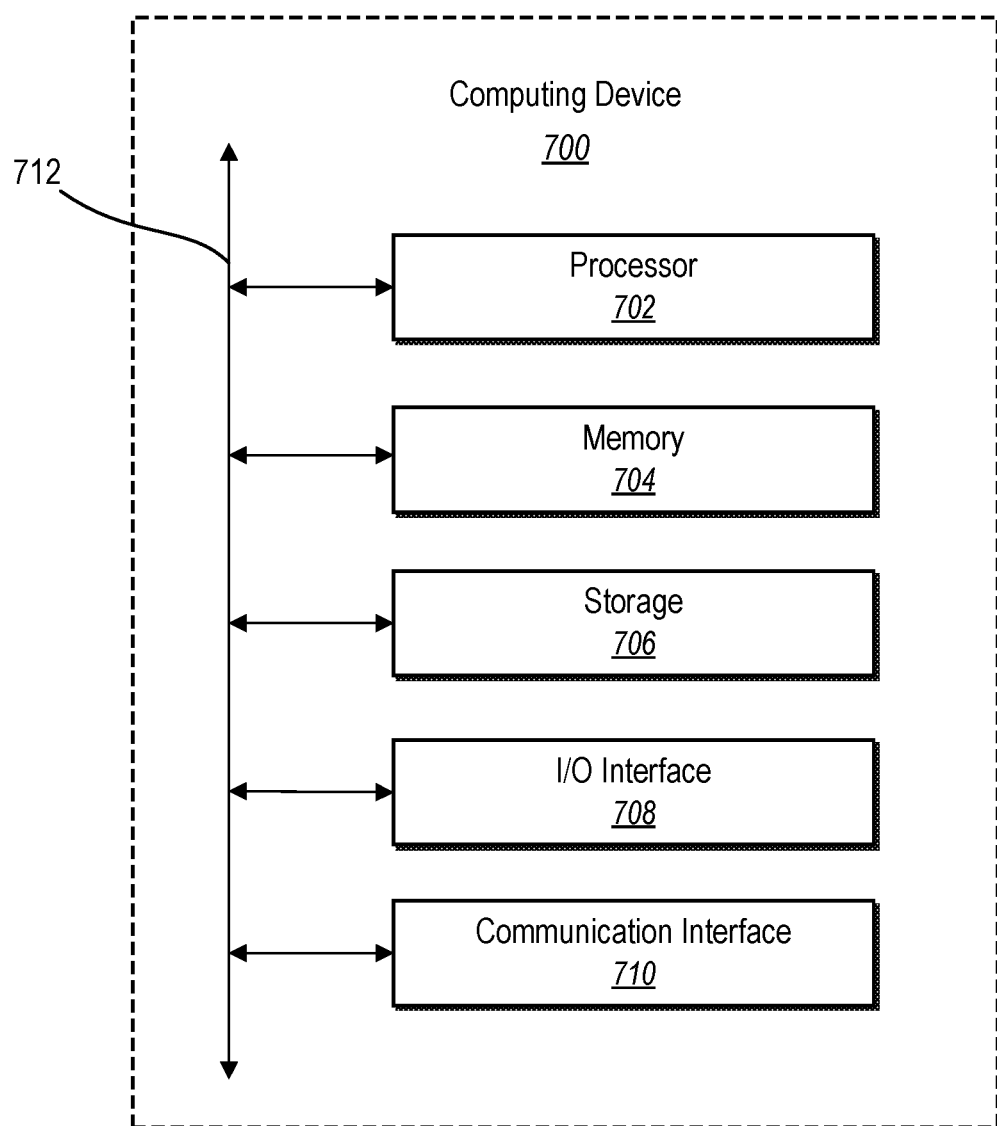
FIG. 7 illustrates a block diagram of an example computing device in accordance with one or more embodiments.

FIG. 7 illustrates, in block diagram form, an exemplary computing device 700 that may be configured to perform one or more of the processes described above. One will appreciate that the client device 102 and server device 110 each comprise one or more computing devices in accordance with implementations of computing device 700. As shown by FIG. 7, the computing device can comprise a processor 702, a memory 704, a storage device 706, an I/O interface 708, and a communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless.

As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the scan detection system 104 may be linked to and/or implemented within a social-networking system (e.g., social networking system 112). A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 8:
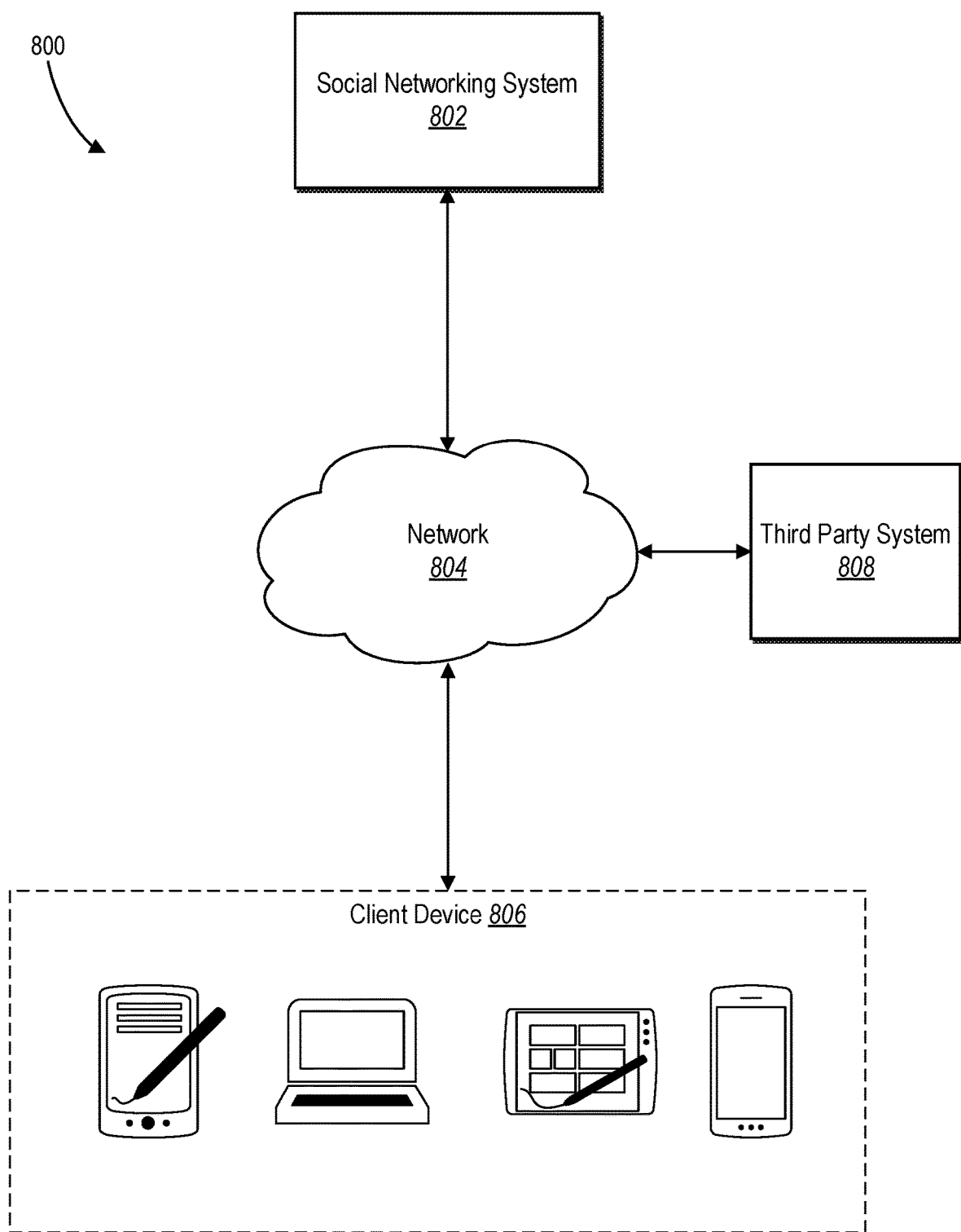
FIG. 8 illustrates an example network environment of a social networking system in accordance with one or more embodiments.

FIG. 8 illustrates an example network environment 800 of a social-networking system. In particular embodiments, a social-networking system 802 may comprise one or more data stores. In particular embodiments, the social-networking system 802 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 802 may comprise one or more computing devices (e.g., servers) hosting functionality directed to operation of the social-networking system 802. A user of the social-networking system 802 may access the social-networking system 802 using a client device such as client device 806. In particular embodiments, the client device 806 can interact with the social-networking system 802 through a network 804.

The client device 806 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access the social-networking system 802.

While these methods, systems, and user interfaces use both publicly available information as well as information provided by users of the social-networking system, all use of such information is to be explicitly subject to all privacy settings of the involved users and the privacy policy of the social-networking system as a whole.

Figure 9:
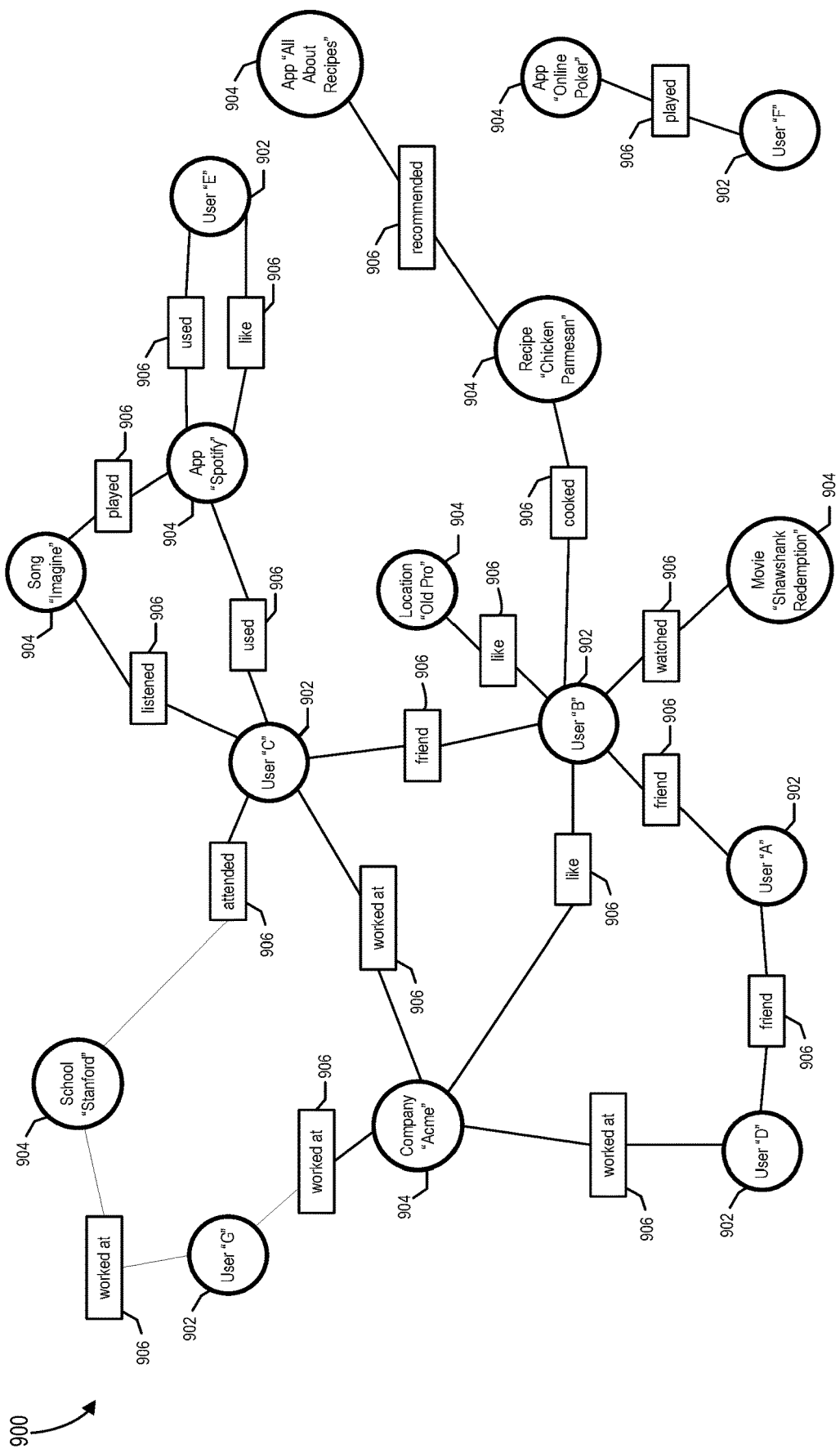
FIG. 9 illustrates a social graph in accordance with one or more embodiments.

FIG. 9 illustrates example social graph 900. In particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. The example social graph 900 illustrated in FIG. 9 is shown, for didactic purposes, in a two-dimensional visual map representation. In particular embodiments, a social networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social networking system 802 a message indicating the user's action. In response to the message, social networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or use an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be used to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may use one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving, from a social networking system to a mobile client device, a coupon comprising a scannable code for use at a merchant;
   detecting, by at least one processor on the mobile client device, a display of the scannable code by the mobile client device, wherein the mobile client device corresponds to a user entity on a social networking system and the scannable code corresponds to a third-party entity on the social networking system;
   activating multiple sensors of the mobile client device to capture multiple sensor outputs, wherein the multiple sensors comprise at least an audio, motion, and global positioning (GPS) sensor;
   analyzing the multiple sensor outputs to identify a combination of discrete signals, the combination of discrete signals comprising a signal representing a rotation of the mobile client device towards a scanning device of the merchant;
   calculating by the mobile client device, based on the combination of discrete signals and using a prediction model trained via previous scan determinations, a probability that the scannable code has likely been scanned by the scanning device;
   determining, based on the calculated probability, a scanned status for the scannable code in relation to the user entity; and
   providing, via the mobile client device, an identity of the user entity, when the scannable code was scanned, location data from the GPS sensor of where the scannable code was scanned, and the scanned status to the social networking system to track usage of one or more scannable codes across multiple user entities on the social networking system.

2. The method of claim 1, further comprising receiving, at the mobile client device, the scannable code via a social networking application associated with the social networking system.

3. The method of claim 2, further comprising receiving the scannable code upon user interaction from the mobile client device with the coupon within social network profile of the third-party entity within the social networking application.

4. The method of claim 1, further comprising providing, to the social networking system, a notification of whether the scannable code has been scanned by the scanning device.

5. The method of claim 1, wherein the discrete signals comprise a signal representing an audible beep of scanning device.

6. The method of claim 1, further comprising determining that the mobile client device is at a location associated with scanning of the scannable code utilizing the GPS sensor while detecting the display of the scannable code by the mobile client device.

7. The method of claim 6, wherein the multiple sensor outputs are analyzed in response to determining that the mobile client device is at the location associated with scanning the scannable code.

8. The method of claim 1, further comprising, in response to determining whether the scannable code has likely been scanned by the mobile client device, de-activating one or more sensors from the multiple activated sensors of the mobile client device capturing the multiple sensor outputs.

9. The method of claim 1, further comprising:
   determining that the scannable code is not displayed by the mobile client device; and
   in response to determining that the scannable code is not displayed, de-activating one or more sensors from the multiple activated sensors of the mobile client device capturing the multiple sensor outputs.

10. The method of claim 1, wherein analyzing the multiple sensor outputs to identify the combination of discrete signals comprises:
    comparing the combination of discrete signals to one or more predefined signals that have been determined to positively or negatively indicate whether a given scannable code displayed on a given mobile client device has been scanned by a scanning device; and
    identifying one or more of the predefined signals corresponding to one or more of the combination of discrete signals.

11. The method of claim 1, wherein determining whether the scannable code has likely been scanned by the scanning device comprises determining whether the calculated probability meets a threshold probability that the scannable code has likely been scanned by the scanning device.

12. The method of claim 1, wherein the scanned status indicates that the scannable code has been scanned and further comprising providing the scanned status to the third-party entity on the social networking system.

13. A system comprising:
    at least one processor; and
    at least one non-transitory computer readable storage medium storing instructions thereon that, when executed by at least one processor, cause the system to:
        receive, from a social networking system to a mobile client device, a coupon comprising a scannable code for use at a merchant;
        detect, by the mobile client device, a display of the scannable code by the mobile client device, wherein the mobile client device corresponds to a user entity on a social networking system and the scannable code corresponds to a third-party entity on the social networking system;
        activate multiple sensors of the mobile client device to capture multiple sensor outputs, wherein the multiple sensors comprise at least an audio, motion, and global positioning (GPS) sensor;
        analyze the multiple sensor outputs to identify a combination of discrete signals, the combination of discrete signals comprising a signal representing a rotation of the mobile client device towards a scanning device of the merchant;
        calculate by the mobile client device, based on the combination of discrete signals and using a prediction model trained via previous scan determinations, a probability that the scannable code has likely been scanned by the scanning device;
        determine, based on the calculated probability, a scanned status for the scannable code in relation to the user entity; and
        provide, via the mobile client device, an identity of the user entity, when the scannable code was scanned, location data from the GPS sensor of where the scannable code was scanned, and the scanned status to the social networking system to track usage of one or more scannable codes across multiple user entities on the social networking system.

14. The system of claim 13, further comprising instructions thereon that, when executed by the at least one processor, cause the system to:
    determine that the mobile client device is at a location associated with scanning of the scannable code utilizing the GPS sensor while detecting the display of the scannable code by the mobile client device;
    determine that the scannable code is not displayed by the mobile client device or that the mobile client device has moved away from the location associated with scanning the scannable code; and
    in response to determining that the scannable code is not displayed or that the mobile client device is not at the location associated with scanning the scannable code, de-activating one or more sensors from the multiple activated sensors of the mobile client device capturing the multiple sensor outputs.

15. The system of claim 13, wherein the scanned status indicates that the scannable code has been scanned and further comprising instructions thereon that, when executed by the at least one processor, cause the system to provide the scanned status to the third-party entity on the social networking system.

16. The system of claim 13, further comprising instructions thereon that, when executed by the at least one processor, cause the system to provide, to the social networking system, a notification of whether the scannable code has been scanned by the scanning device.

17. A non-transitory computer readable medium storing instructions thereon that, when executed by at least one processor, cause a mobile client device to:
    receive, from a social networking system to a mobile client device, a coupon comprising a scannable code for use at a merchant;
    detect a display of the scannable code by the mobile client device, wherein the mobile client device corresponds to a user entity on a social networking system and the scannable code corresponds to a third-party entity on the social networking system;
    activate multiple sensors of the mobile client device to capture multiple sensor outputs, wherein the multiple sensors comprise at least an audio, motion, and global positioning (GPS) sensor;
    analyze the multiple sensor outputs to identify a combination of discrete signals, the combination of discrete signals comprising a signal representing a rotation of the mobile client device towards a scanning device of the merchant;
    calculate by the mobile client device, based on the combination of discrete signals and using a prediction model trained via previous scan determinations, a probability that the scannable code has likely been scanned by the scanning device;
    determine, based on the calculated probability a scanned status for the scannable code in relation to the user entity; and
    provide, via the mobile client device, an identity of the user entity when the scannable code was scanned, location data from the GPS sensor of where the scannable code was scanned, and the scanned status to the social networking system to track usage of one or more scannable codes across multiple user entities on the social networking system.

18. The non-transitory computer readable medium of claim 17, further comprising instructions that, when executed by the at least one processor, cause the mobile client device to determine that the mobile client device is at a location associated with scanning of the scannable code utilizing the GPS sensor while detecting the display of the scannable code by the mobile client device.

19. The non-transitory computer readable medium of claim 17, wherein the prediction model is trained based on correct and incorrect previous scan determinations of scanned codes.

20. The non-transitory computer readable medium of claim 17, wherein the scanned status indicates that the scannable code has been scanned and further comprising providing the scanned status to the third-party entity on the social networking system.

* * * * *